(12) United States Patent
Kania et al.

(10) Patent No.: US 9,181,105 B2
(45) Date of Patent: Nov. 10, 2015

(54) FLOATING TREATMENT STREAMBED

(71) Applicant: Fountainhead, LLC, Shepherd, MT (US)

(72) Inventors: Bruce G. Kania, Shepherd, MT (US); Frank M. Stewart, Bozeman, MT (US)

(73) Assignee: Fountainhead, LLC, Sheperd, MT (US)

( * ) Notice: Subject to any disclaimer, the term of this patent is extended or adjusted under 35 U.S.C. 154(b) by 202 days.

(21) Appl. No.: 13/734,877

(22) Filed: Jan. 4, 2013

(65) Prior Publication Data
US 2013/0168304 A1 Jul. 4, 2013

Related U.S. Application Data

(63) Continuation-in-part of application No. 12/940,111, filed on Nov. 5, 2010, now Pat. No. 8,372,277.

(60) Provisional application No. 61/260,800, filed on Nov. 12, 2009.

(51) Int. Cl.
| C02F 3/06 | (2006.01) |
| C02F 3/32 | (2006.01) |
| C02F 7/00 | (2006.01) |
| C02F 1/00 | (2006.01) |
| A01G 31/02 | (2006.01) |
| C02F 3/10 | (2006.01) |
| C02F 1/28 | (2006.01) |
| C02F 103/00 | (2006.01) |

(52) U.S. Cl.
CPC ............... *C02F 1/001* (2013.01); *A01G 31/02* (2013.01); *C02F 3/06* (2013.01); *C02F 3/105* (2013.01); *C02F 3/327* (2013.01); *C02F 1/283* (2013.01); *C02F 7/00* (2013.01); *C02F 2103/007* (2013.01); *C02F 2203/008* (2013.01); *Y02W 10/15* (2015.05); *Y02W 10/18* (2015.05); *Y02W 10/37* (2015.05)

(58) Field of Classification Search
CPC .............. C02F 3/06; C02F 3/32; C02F 3/327; C02F 7/00; C02F 2103/007; C02F 2203/008; A01G 31/02
USPC ............ 210/150, 151, 170.05, 170.09, 170.1, 210/242.1, 242.2, 602, 615, 747.6; 405/52
See application file for complete search history.

(56) References Cited

U.S. PATENT DOCUMENTS

| 3,320,928 | A |   | 5/1967 | Smith |              |
| 3,768,200 | A | * | 10/1973 | Klock | ............... 210/602 |
| 4,030,859 | A |   | 6/1977 | Henegar |         |
| 4,333,263 | A |   | 6/1982 | Adey |            |
| 4,350,589 | A | * | 9/1982 | Stog | ............... 210/242.2 |
| 4,582,609 | A |   | 4/1986 | Hunter, III et al. | |
| 4,806,251 | A | * | 2/1989 | Durda | ............... 210/747.6 |
| 5,096,577 | A |   | 3/1992 | Ngo et al. |     |

(Continued)

*Primary Examiner* — Christopher Upton
(74) *Attorney, Agent, or Firm* — Eric L. Lane; Green Patent Law

(57) ABSTRACT

A floating streambed comprising a circulation pump having an inlet hose or pipe, an inlet hose or pipe depth adjuster, and one or more treatment channels comprised of permeable matrix. The floating streambed floats on a water body. Water enters the inlet hose or pipe from the water body and is pumped by the circulation pump into the treatment channels. The treatment channels are comprised of permeable matrix, and water entering the treatment channels flows both horizontally through the treatment channel and into the water body and also vertically downward through the permeable matrix of the treatment channels.

14 Claims, 30 Drawing Sheets

(56) References Cited

U.S. PATENT DOCUMENTS

| | | |
|---|---|---|
| 5,143,623 A | 9/1992 | Kroll |
| 5,342,512 A | 8/1994 | Ngo et al. |
| 5,344,557 A * | 9/1994 | Scanzillo .................. 210/242.1 |
| 5,409,601 A | 4/1995 | Ngo et al. |
| 5,527,456 A | 6/1996 | Jensen |
| 5,528,856 A | 6/1996 | Smith et al. |
| 5,573,669 A | 11/1996 | Jensen |
| 5,595,891 A | 1/1997 | Hsu |
| 5,755,976 A | 5/1998 | Kortmann |
| 5,766,474 A | 6/1998 | Smith et al. |
| 5,811,007 A | 9/1998 | Stewart et al. |
| 5,820,759 A | 10/1998 | Stewart et al. |
| 5,846,423 A | 12/1998 | Jensen |
| 5,851,398 A | 12/1998 | Adey |
| 6,220,822 B1 | 4/2001 | Khudenko |
| 6,231,766 B1 * | 5/2001 | Hausin .................... 210/170.05 |
| 6,274,047 B1 * | 8/2001 | Bates et al. ................ 210/747.6 |
| 6,277,274 B1 | 8/2001 | Coffman |
| 6,569,321 B2 | 5/2003 | Coffman |
| 6,676,837 B2 | 1/2004 | Keeton, Jr. |
| 6,751,903 B2 | 6/2004 | Shyrock |
| 6,783,676 B2 | 8/2004 | Jensen |
| 7,014,767 B2 | 3/2006 | Jensen |
| 7,172,691 B2 | 2/2007 | Dunlop et al. |
| 7,267,328 B2 | 9/2007 | Witheridge |
| 7,314,562 B2 | 1/2008 | Svirklys et al. |
| 7,520,493 B1 | 4/2009 | Haldane |
| 7,575,685 B2 | 8/2009 | Morris et al. |
| 7,581,716 B2 | 9/2009 | Tsai |
| 7,776,216 B1 * | 8/2010 | Jensen et al. ............. 210/170.05 |
| 7,874,548 B1 | 1/2011 | McGuffin |
| 7,972,570 B2 | 7/2011 | Vieira et al. |
| 8,016,273 B1 | 9/2011 | Dartez |
| 8,372,277 B2 * | 2/2013 | Kania et al. .................. 210/151 |
| 2001/0045383 A1 | 11/2001 | Coffman |
| 2002/0104807 A1 | 8/2002 | Keeton, Jr. |
| 2003/0102580 A1 | 6/2003 | Khudenko |
| 2003/0159987 A1 | 8/2003 | Jensen |
| 2005/0092677 A1 | 5/2005 | Jensen |
| 2005/0242450 A1 | 11/2005 | Witheridge |
| 2005/0269260 A1 | 12/2005 | Austin |
| 2006/0144783 A1 | 7/2006 | Jensen |
| 2006/0151385 A1 * | 7/2006 | Burrows et al. ............... 210/600 |
| 2007/0144965 A1 | 6/2007 | Morris et al. |
| 2009/0155147 A1 | 6/2009 | Vieira et al. |
| 2010/0039061 A1 | 2/2010 | Rosenbaum |
| 2012/0012516 A1 * | 1/2012 | Torres Junco et al. ..... 210/242.1 |

* cited by examiner

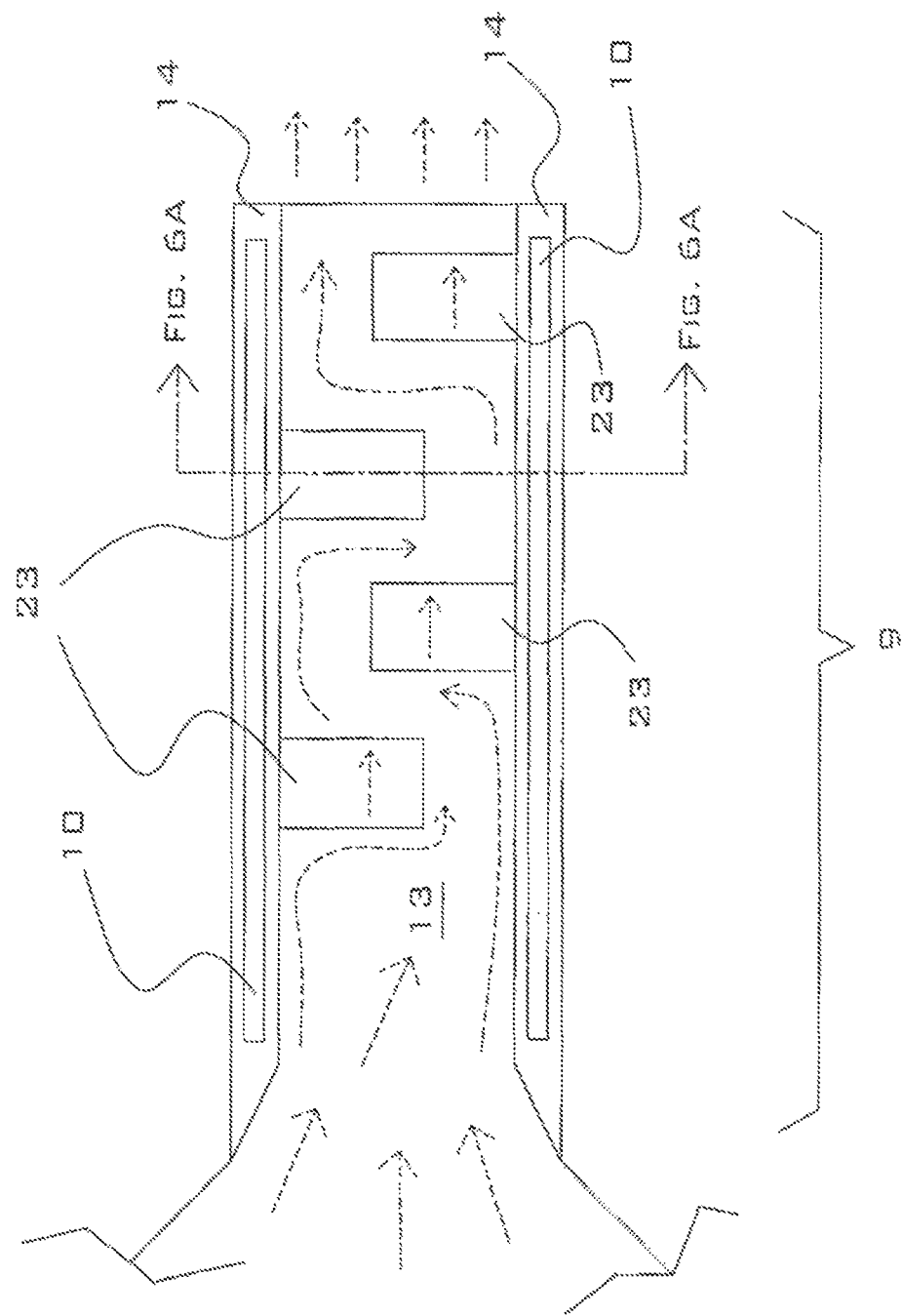

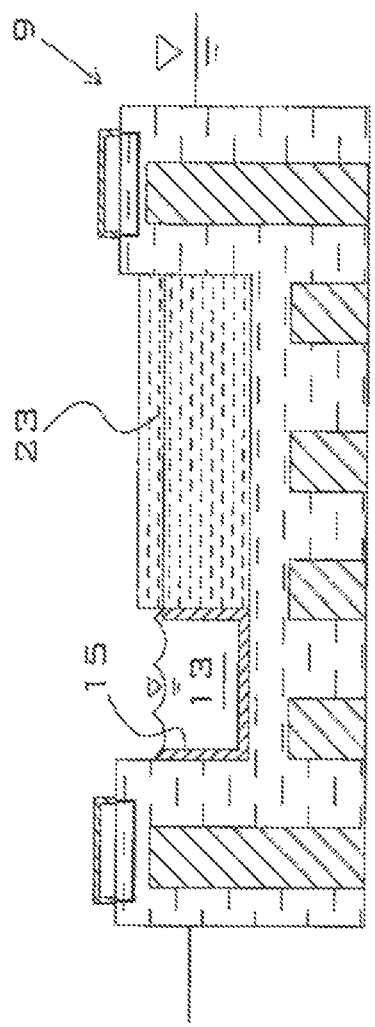

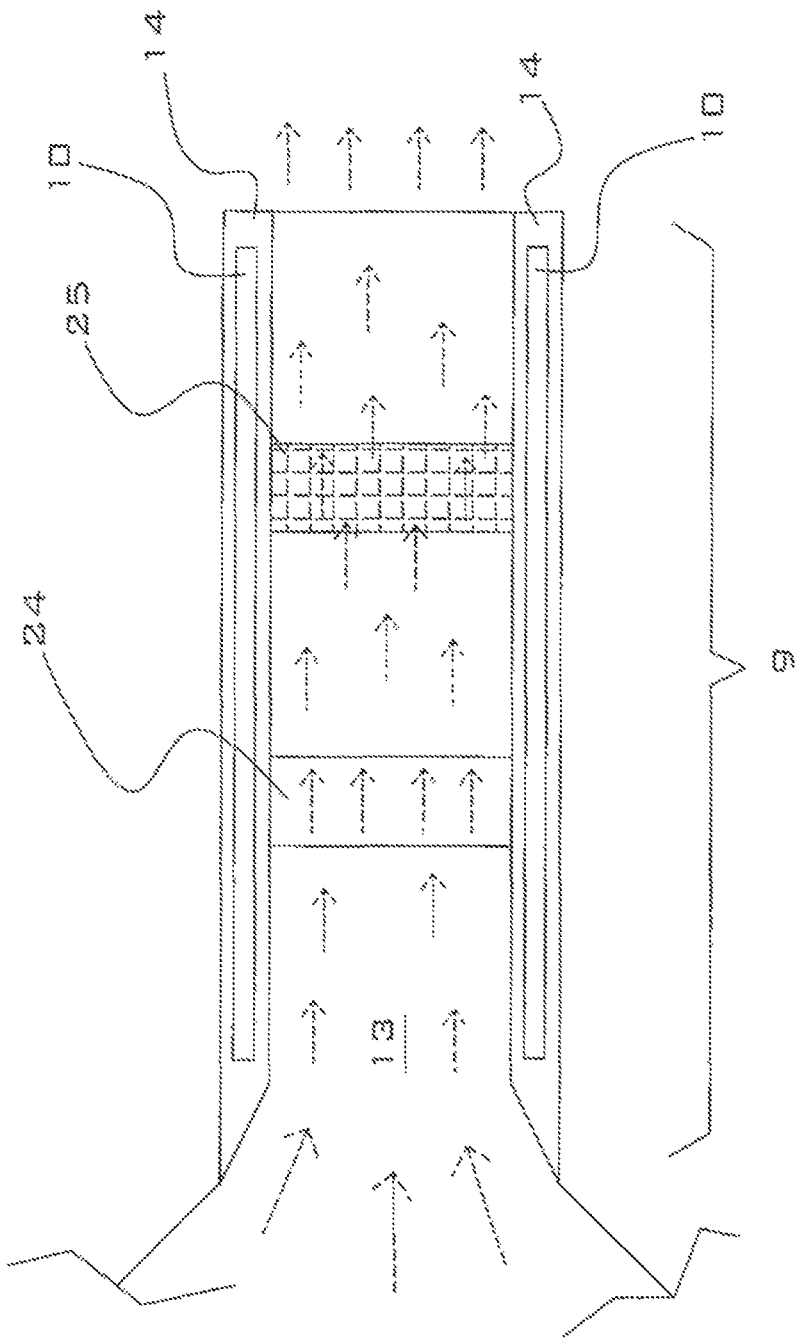

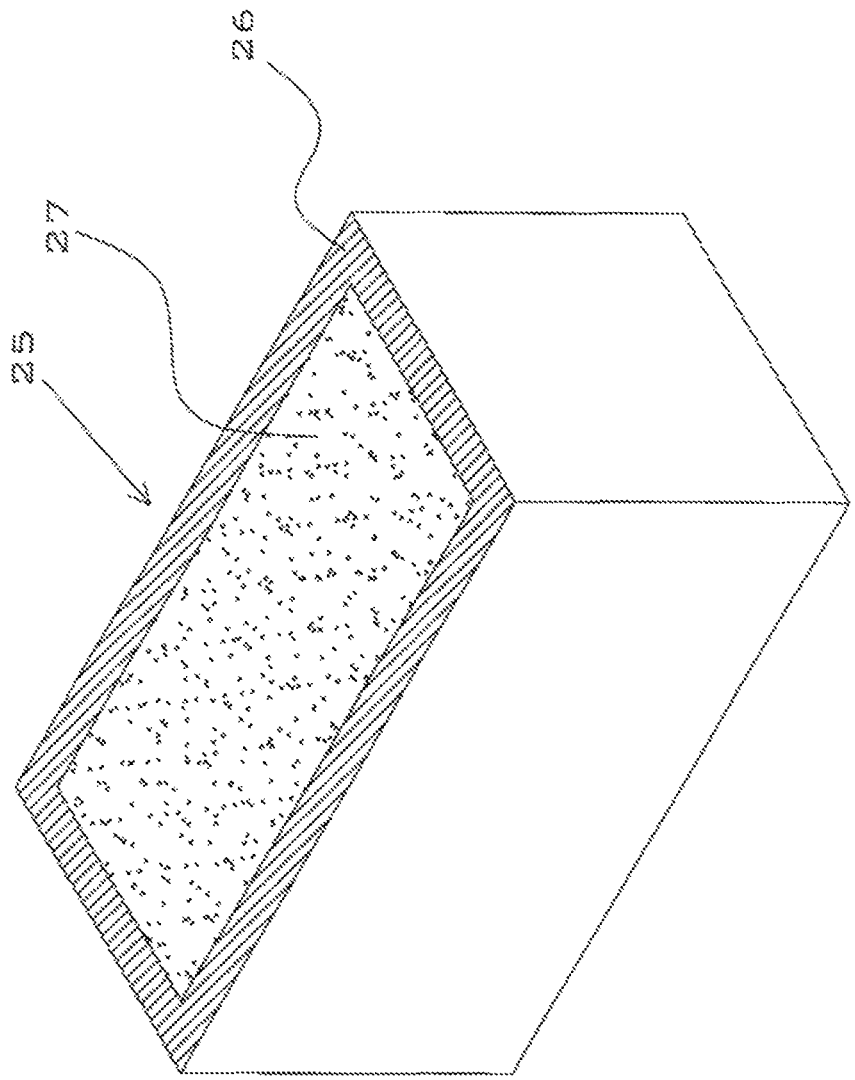

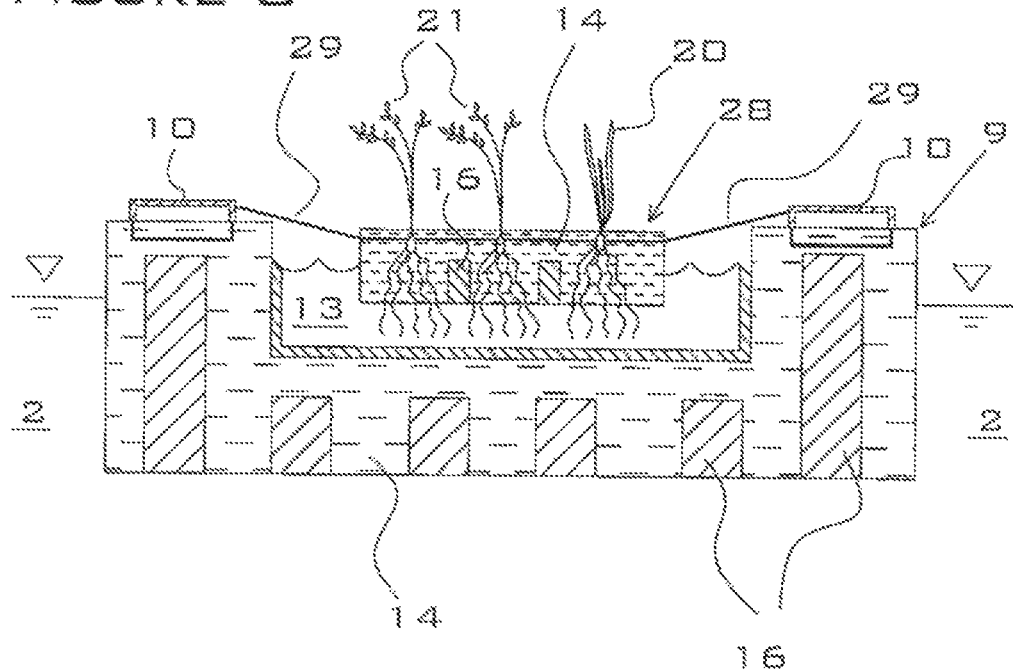
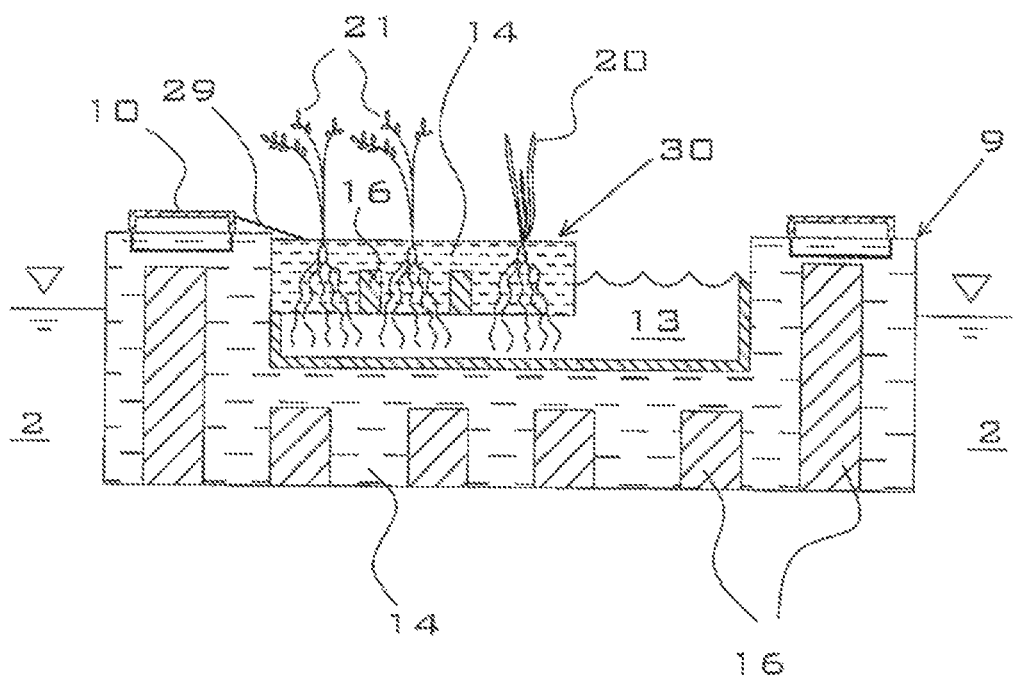

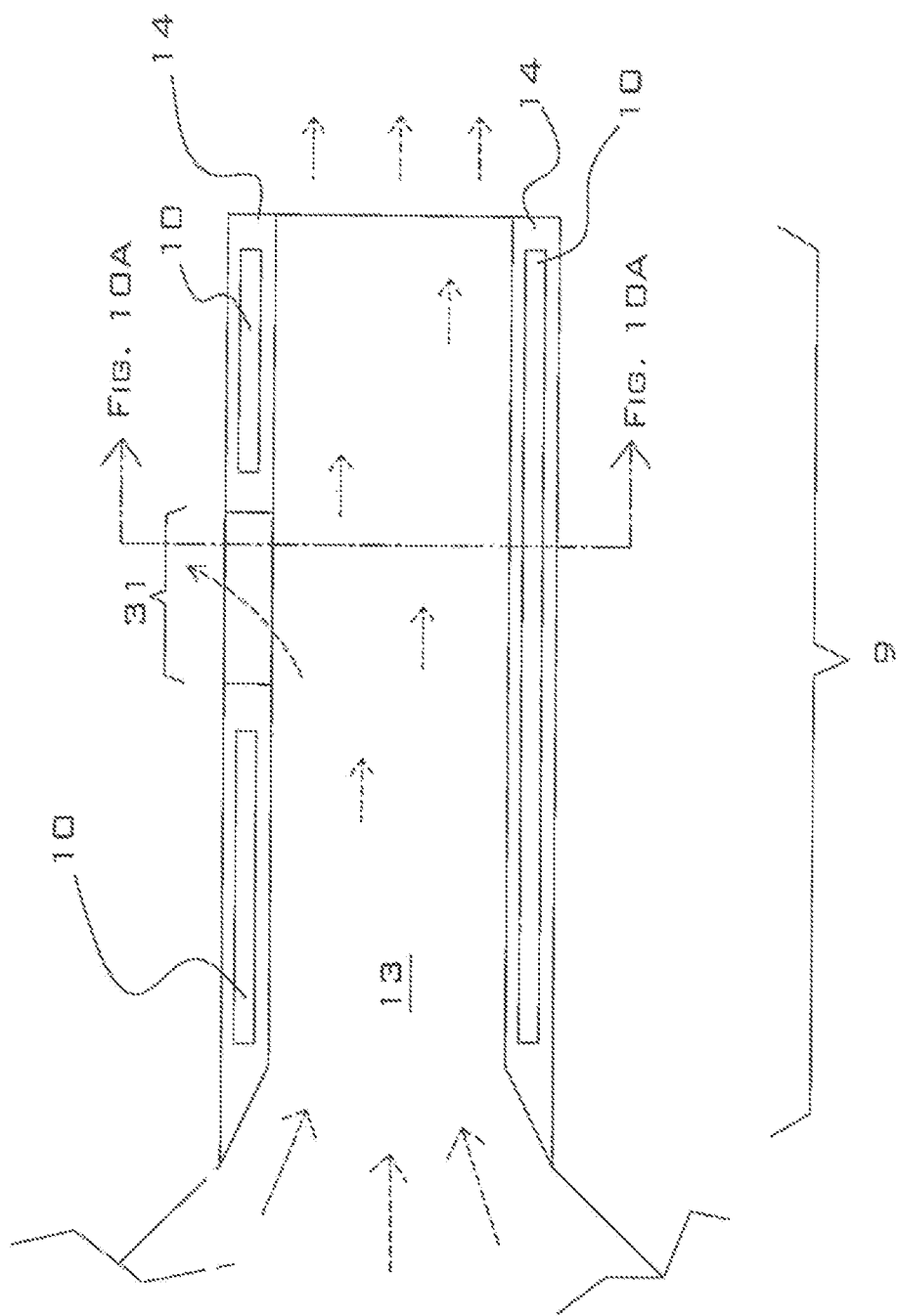

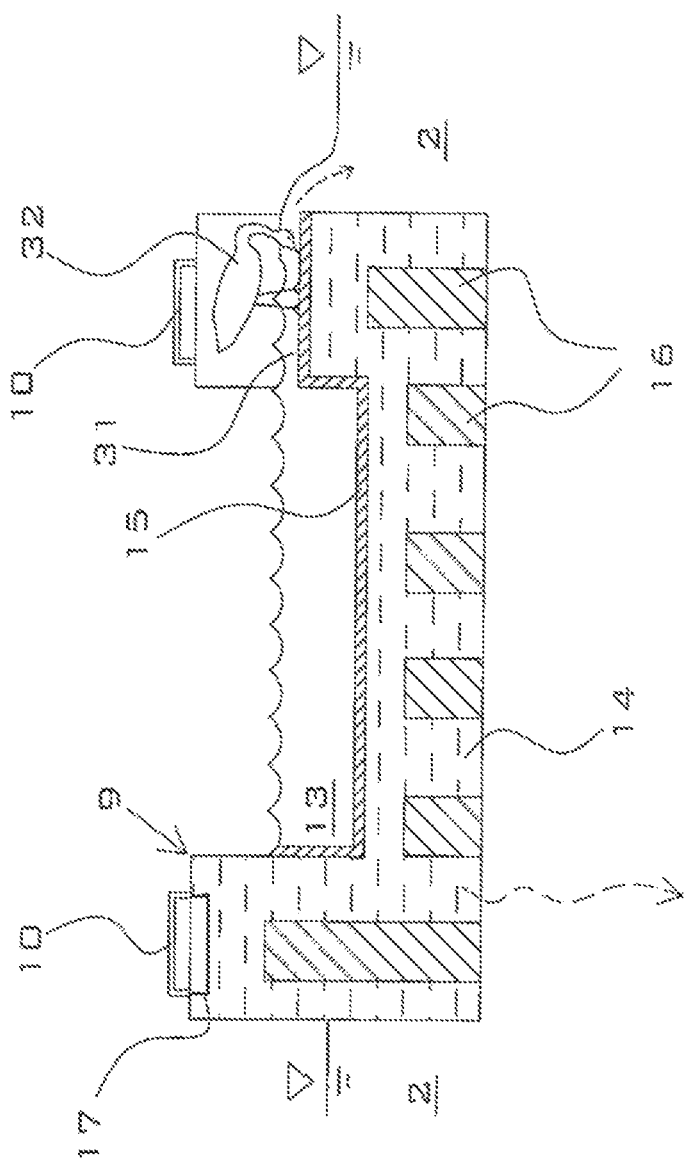

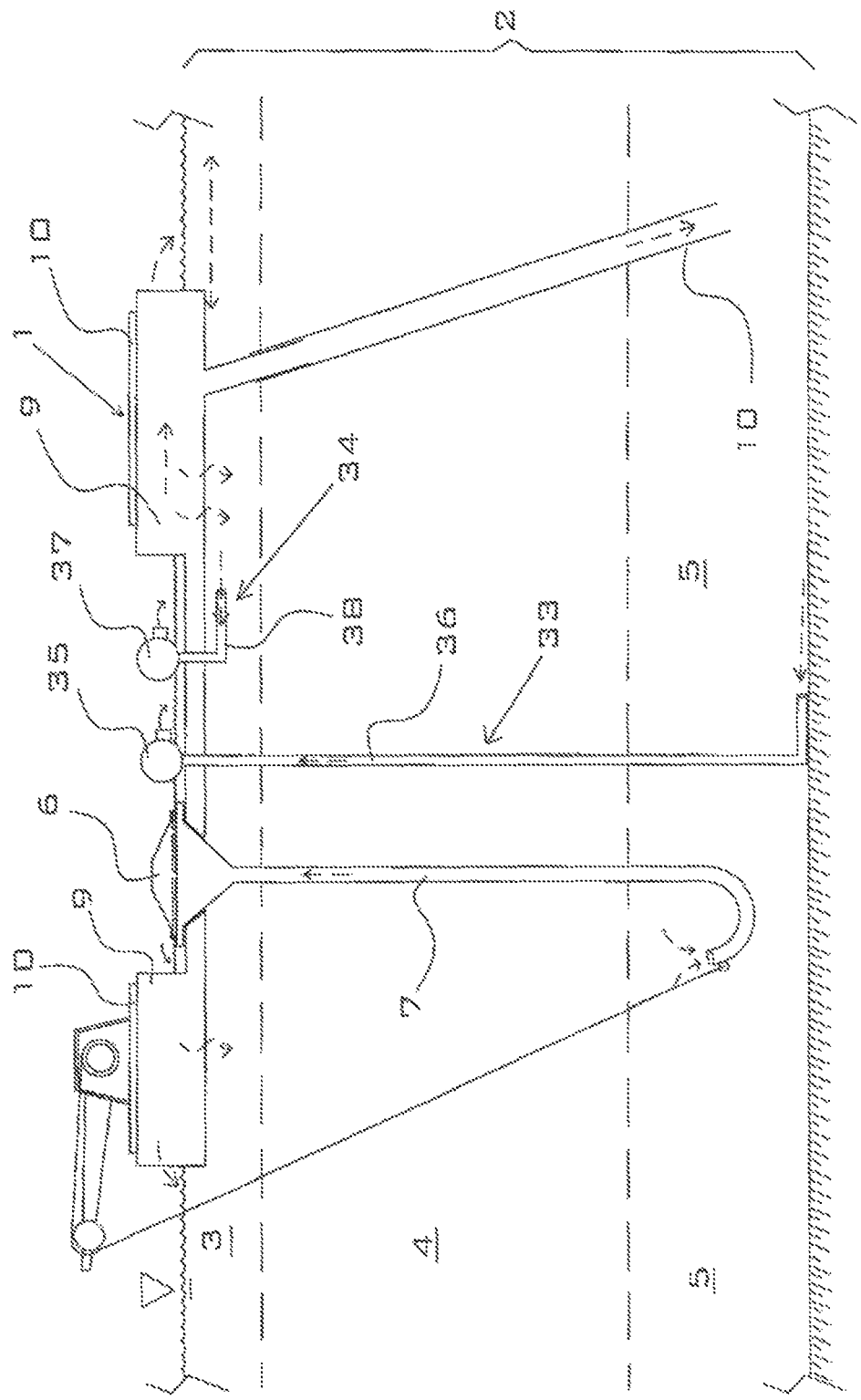

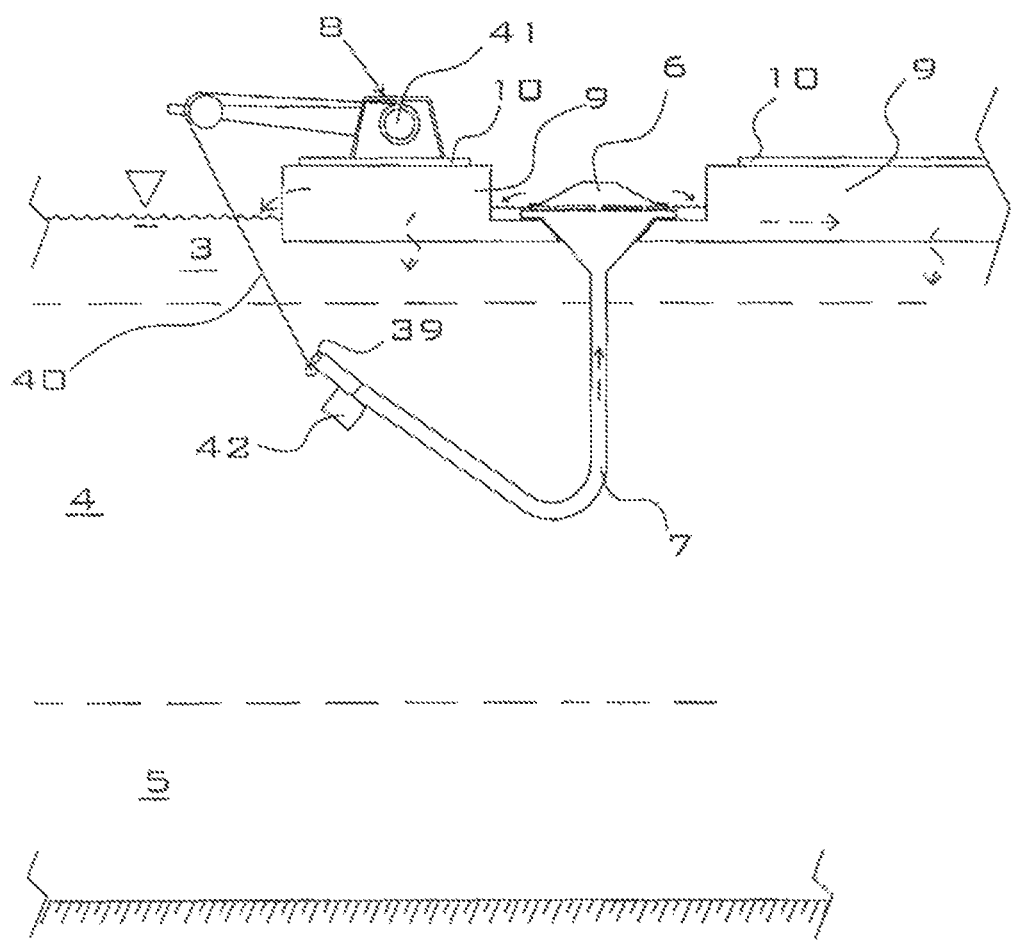

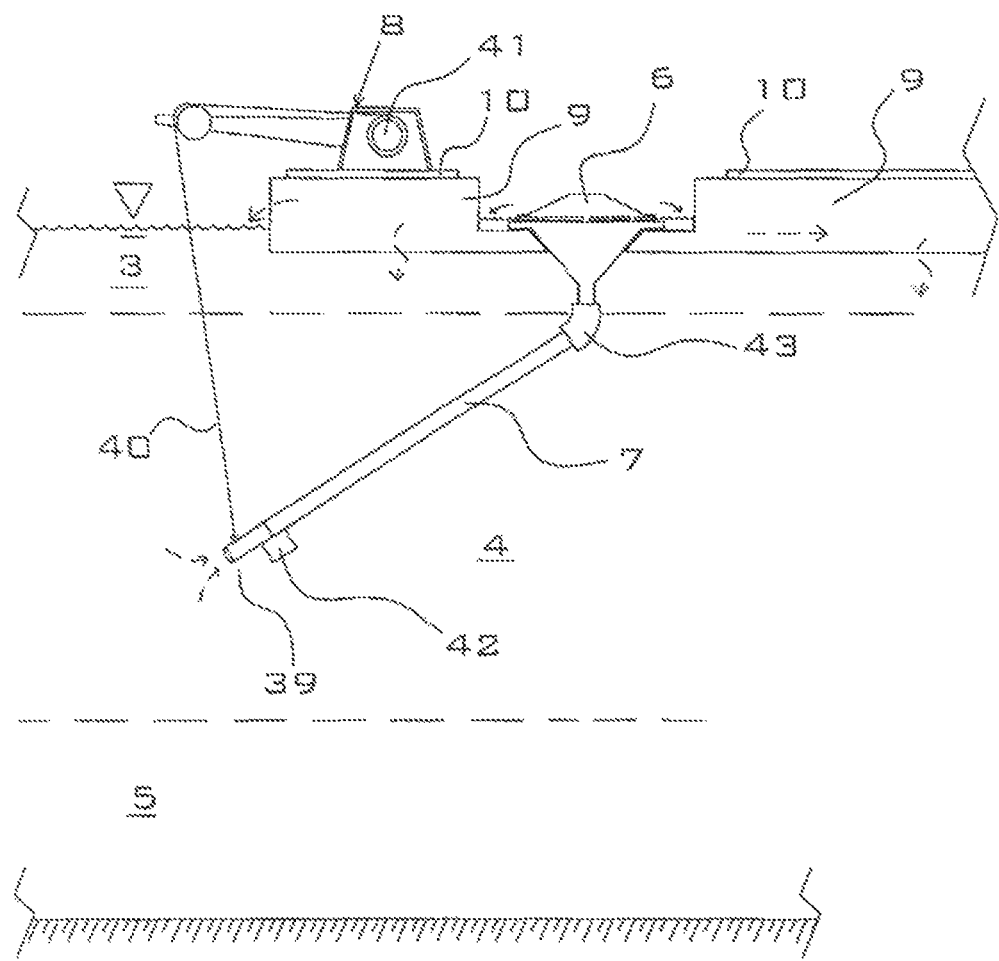

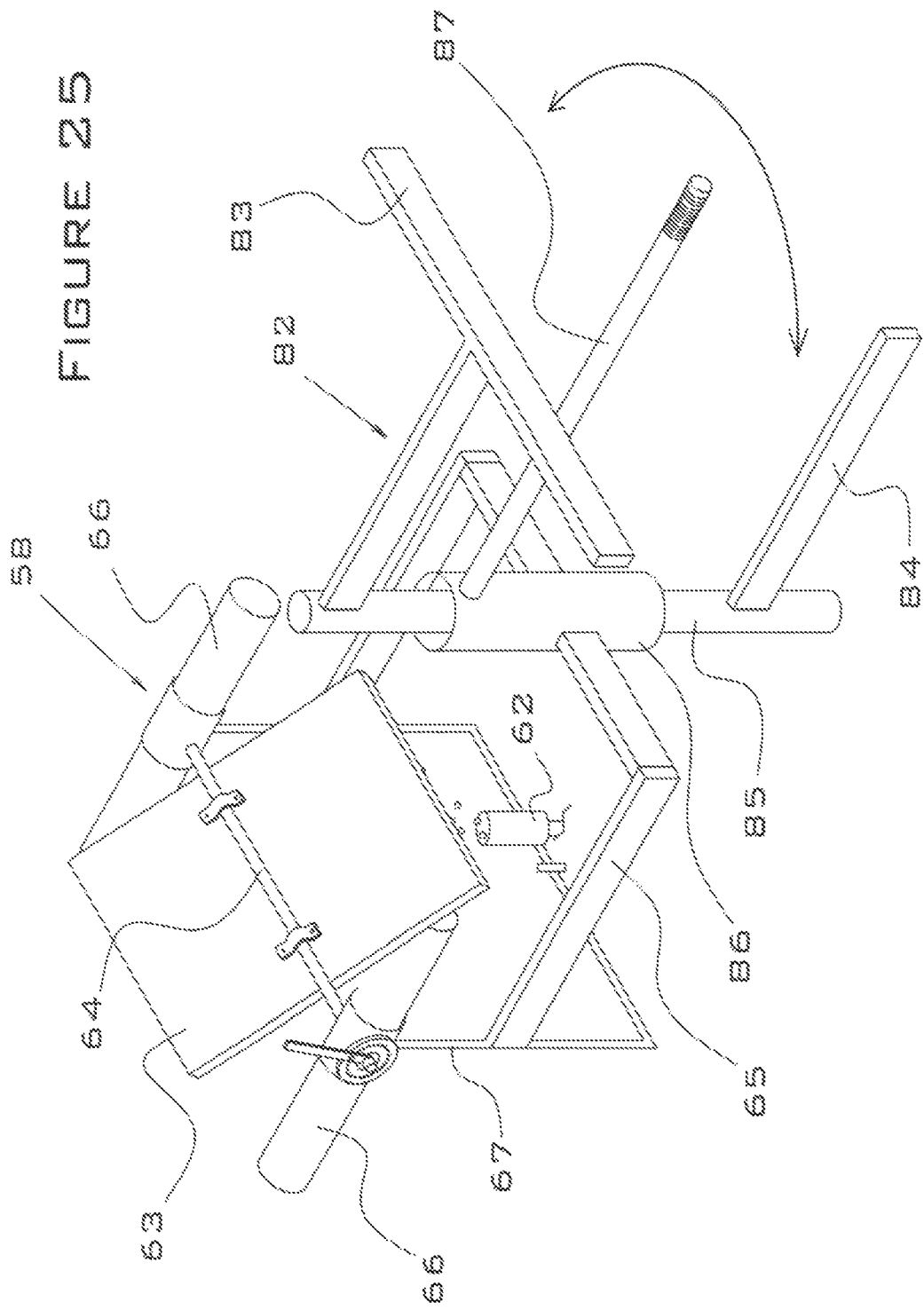

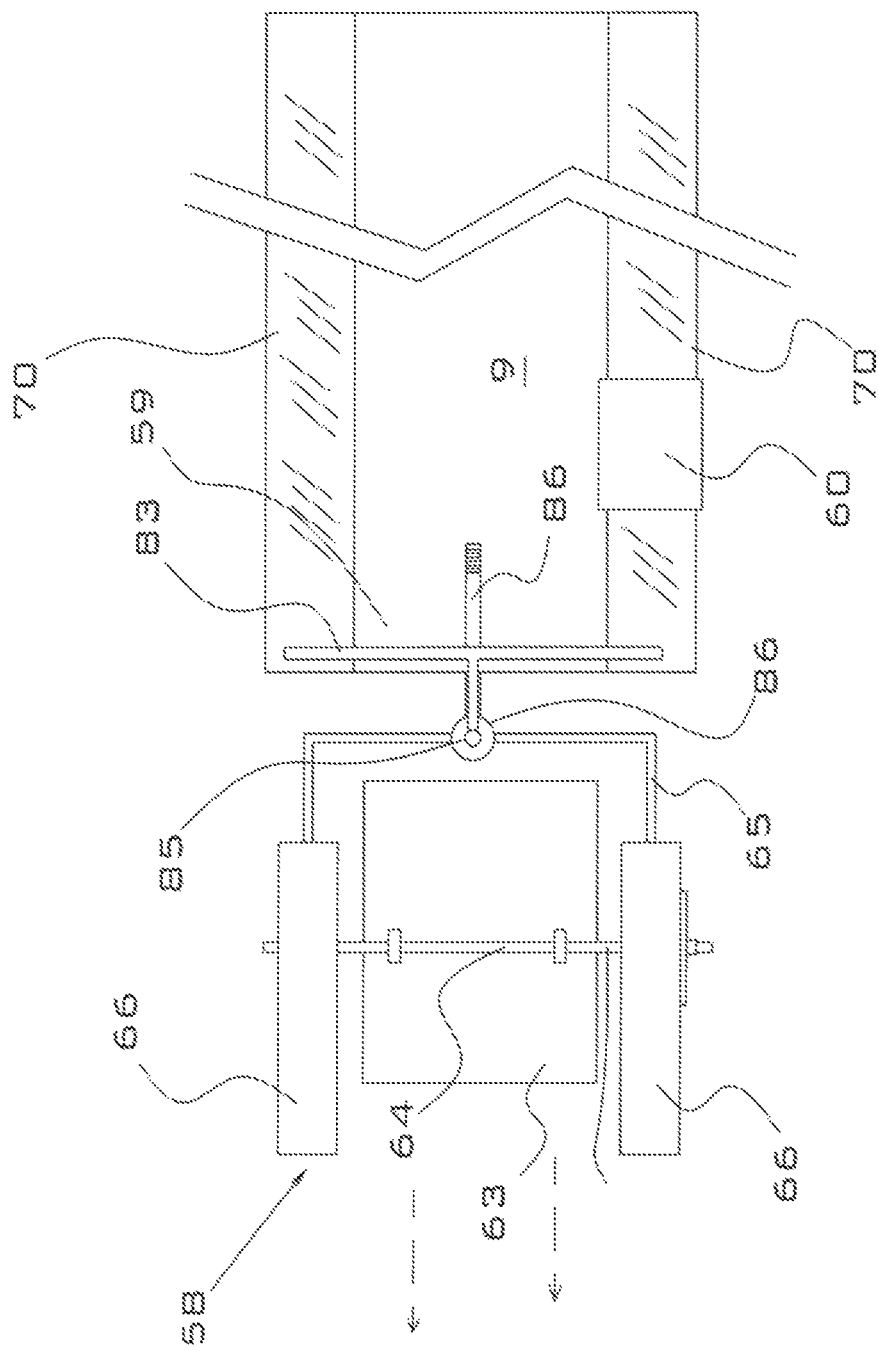

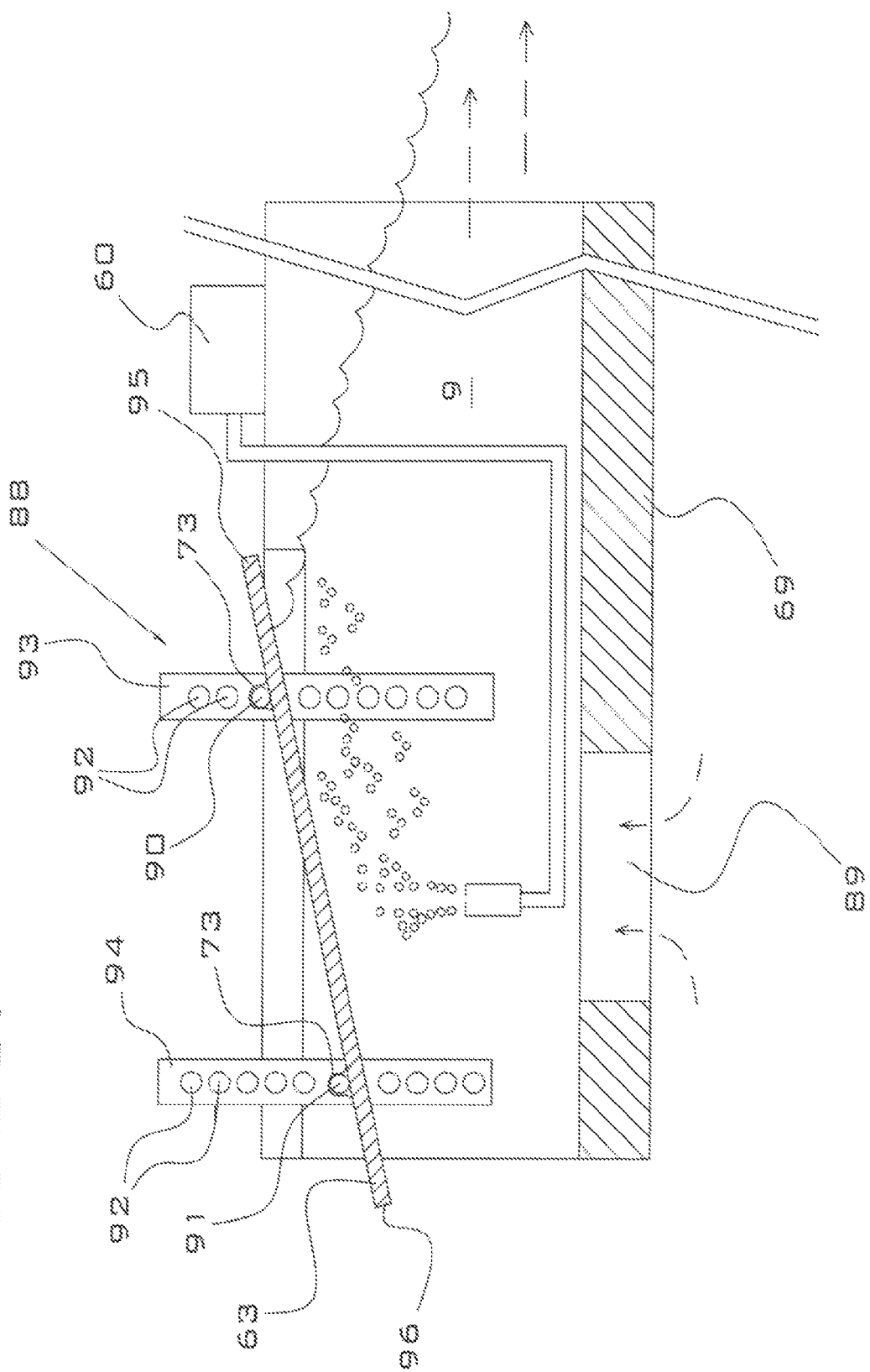

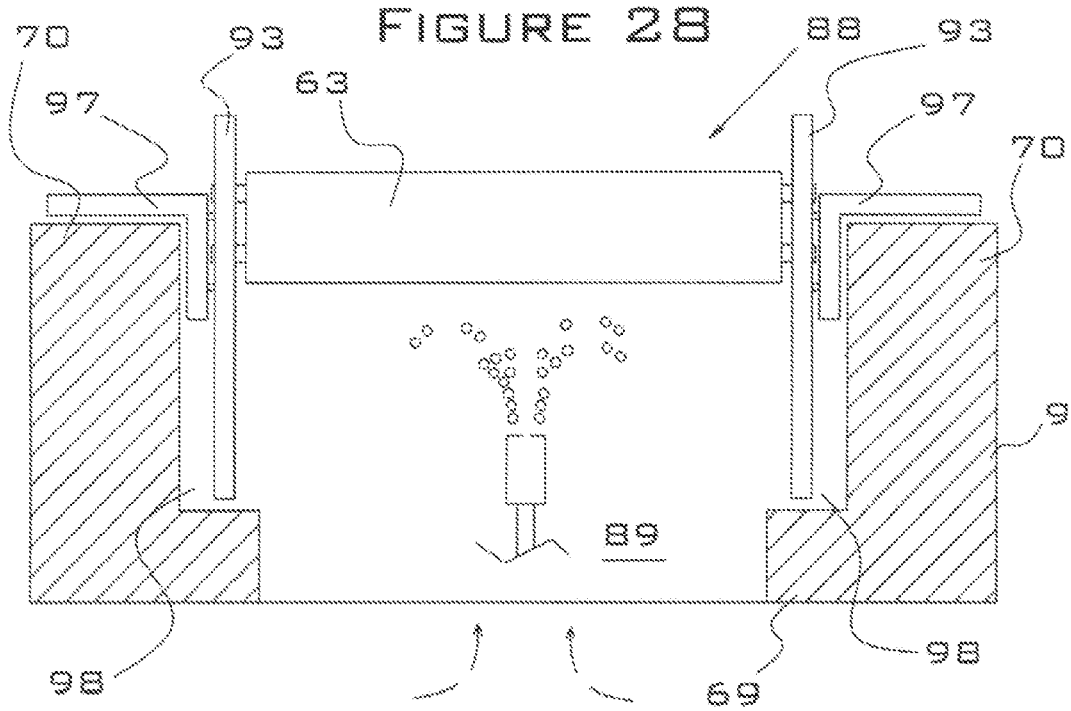

FLOATING TREATMENT STREAMBED

CROSS-REFERENCE TO RELATED APPLICATIONS

This application is a continuation-in-part of U.S. patent application Ser. No. 12/940,111 filed on Nov. 5, 2010, which in turn claims priority under 35 U.S.C. §119(e) back to U.S. Patent Application No. 61/260,800 filed on Nov. 12, 2009.

BACKGROUND OF THE INVENTION

1. Field of the Invention

The present invention relates generally to the field of water treatment, and more specifically, to a floating streambed that utilizes a permeable nonwoven matrix to accomplish filtration of treatment water and allows both inlet and discharge water depth to be adjusted.

2. Description of the Related Art

Many lakes and ponds contain stratified layers of water, in which the cooler lower levels are often deficient in dissolved oxygen and, therefore, unable to provide habitat for fish and other aquatic wildlife species. In some cases, these water bodies tend to contain excess dissolved nutrients, such as nitrogen and phosphorus, from either agricultural or municipal wastes. In many of these lakes, the upper warmer water layers tend to be choked with algae and other nuisance plants such as duckweed (*Lemna* sp.), which thrive in the relatively sunlit and nutrient-rich upper zones, then die and fall to the bottom, where their decay contributes to the oxygen deficiency problem in the deeper zones. Not uncommonly, the majority of the water volume in these bodies is unable to support fish life because the upper layers are deficient in dissolved oxygen due to elevated water temperatures, and the lower layers are simultaneously deficient in dissolved oxygen due to lack of circulation.

Water temperature in combination with dissolved oxygen level can also limit which species of fish may occur in a waterway. In addition to reduced fish sustainability, these stratified waters also have reduced potential for municipal, agricultural, and recreational use because of the presence of toxins and suspended solids resulting from poor circulation and lack of microbiological activity.

Accordingly, it is an object of the present invention to provide a floating streambed that can be used to de-stratify and remove contaminants from a water body. It is a further object of the present invention to provide concentrated habitat for microbial colonization, as well as habitat for fish, shellfish, shorebirds, insects, crustaceans and other biota associated with waterways. Yet another object is to provide a floating streambed with an adjustable-depth water inlet system and an adjustable-depth water discharge system. Yet another object is to provide a floating streambed with walkways that make it easy for a person to walk on top of the floating streambed for operation, maintenance and/or measurement purposes.

BRIEF SUMMARY OF THE INVENTION

The present invention is a floating streambed comprising: an airlift pump comprising a rotatably adjustable deflector plate; and one or more treatment channels comprised of permeable matrix; wherein the floating streambed floats on a water body; wherein water is pumped by the airlift pump into the treatment channels; and wherein water entering the treatment channels flows both along the treatment channels and through the permeable matrix of the treatment channels. In a preferred embodiment, the deflector plate has an angle, and the angle of the deflector plate is adjustable. In an alternate embodiment, the deflector plate has an angle and a height, both the angle and the height of the deflector plate are adjustable, and the height of the deflector plate is adjustable independently of the angle of the deflector plate.

In a preferred embodiment, each treatment channel comprises an inlet, and the airlift pump is installed at the inlet of the treatment channel. In an alternate embodiment, the airlift pump is installed within the treatment channel.

In a preferred embodiment, the airlift pump further comprises an air compressor, an air supply hose, a diffuser, a pivot rod, a pair of lower attachment arms, a pair of upper attachment arms, and a U-shaped hanger; wherein the U-shaped hanger attaches the diffuser and lower attachment arms to the upper attachment arms; wherein the U-shaped hanger is attached to the upper attachment arms via collars that encircle a central portion of each upper attachment arm; wherein the upper attachment arms are attached to sidewalls of the treatment channel; wherein lower attachment arms are attached to a bottom of the treatment channel; and wherein the pivot rod is fixedly attached to the deflector plate and pivotally attached to the upper attachment arms.

In a preferred embodiment, the deflector plate is supported by a first pivot rod having a first end and a second end and a second pivot rod having a first end and a second end, wherein the treatment channel comprises two sidewalls; wherein the first and second ends of the first pivot rod fit into holes in a pair of front support boards mounted on the sidewalls of the treatment channel; wherein the first and second ends of the second pivot rod fit into holes in a pair of rear support boards that are mounted on the sidewalls of the treatment channel; wherein each of the front and rear support boards has a length; and wherein the holes in the front and rear support boards are arranged vertically along the length of the front and rear support boards. Preferably, the invention further comprises a plate lock that is configured to prevent angular rotation of the deflector plate.

In one embodiment, the airlift pump is rigidly affixed to the treatment channel. In another embodiment, the airlift pump is rotatably affixed to the treatment channel. In yet another embodiment, the invention further comprises an extension pipe that is connected to the airlift pump and treatment channel by pipe supports.

In a preferred embodiment, the invention is a floating streambed comprising: a circulation pump; and one or more treatment channels comprised of permeable matrix; wherein the floating streambed floats on a water body; wherein water is pumped by the circulation pump into the treatment channels; and wherein the water entering the treatment channels flows both along the treatment channels and through the permeable matrix of the treatment channels. In another preferred embodiment, the invention is a floating structure comprising: an airlift pump comprising a rotatably adjustable deflector plate; and one or more treatment channels comprised of permeable matrix; wherein the floating structure floats on a water body; wherein water is pumped by the airlift pump into the treatment channels; and wherein the water entering the treatment channels flows both along the treatment channel and through the permeable matrix of the treatment channels.

In yet another preferred embodiment, the invention is a floating streambed comprising: an airlift pump comprising a rotatably adjustable deflector plate; and one or more treatment channels comprised of permeable matrix, wherein the floating streambed floats on a water body; wherein water is pumped by the airlift pump away from the treatment channels; and wherein the airlift pump is rigidly affixed to the floating streambed so as to provide propulsion to the floating streambed. In an alternate embodiment, the invention is a floating streambed comprising: an airlift pump comprising a rotatably adjustable deflector plate; and one or more treatment channels comprised of permeable matrix; wherein the floating streambed floats on a water body; wherein water is pumped by the airlift pump away from the treatment channels; and wherein the airlift pump is rotatably affixed to the floating streambed so as to provide propulsion to the floating streambed.

In yet another preferred embodiment, the invention is a floating structure comprising: an airlift pump comprising a rotatably adjustable deflector plate; and one or more treatment channels comprised of permeable matrix; wherein the floating structure floats on a water body; wherein water is pumped by the airlift pump away from the treatment channels; and wherein the airlift pump is rigidly affixed to the floating structure so as to provide propulsion to the floating structure. In an alternate embodiment, the invention is a floating structure comprising: an airlift pump comprising a rotatably adjustable deflector plate; and one or more treatment channels comprised of permeable matrix; wherein the floating structure floats on a water body; wherein water is pumped by the airlift pump away from the treatment channels; and wherein the airlift pump is rotatably affixed to the floating structure streambed so as to provide propulsion to the floating structure.

In a preferred embodiment, the invention is a floating streambed comprising at least one treatment channel and a propulsion system, wherein the propulsion system comprises an airlift pump that is rigidly affixed to the inlet end of a treatment channel. In another preferred embodiment, the invention is a floating streambed comprising at least one treatment channel and a steerable propulsion system, wherein the propulsion system comprises an airlift pump that is rotatably affixed to the inlet end of a treatment channel.

In a preferred embodiment, the invention is a floating structure comprising at least one treatment channel and a propulsion system, wherein the propulsion system comprises an airlift pump that is rigidly affixed to the inlet end of a treatment channel. In another preferred embodiment, the invention is a floating structure comprising at least one treatment channel and a steerable propulsion system, wherein the propulsion system comprises an airlift pump that is rotatably affixed to the inlet end of a treatment channel.

BRIEF DESCRIPTION OF THE DRAWINGS

FIG. 6 is a schematic top view of a fourth embodiment of a treatment channel incorporating three-dimensional baffles.
FIG. 6A is a schematic cross-section view of the treatment channel shown in FIG. 6.
FIG. 7 is a schematic top view of a fifth embodiment of a treatment channel.
FIG. 7A is a perspective view of the absorbent channel tilter shown in FIG. 7.
FIG. 8 is a schematic cross-section side view of a sixth embodiment of a treatment channel that comprises an in-stream floating treatment island.
FIG. 9 is a schematic cross-section side view of a seventh embodiment of a treatment channel that comprises an overhanging treatment bank.
FIG. 10 is a schematic top view of an eighth embodiment of a treatment channel that incorporates a side exit channel.
FIG. 10A is a schematic cross-section side view of the treatment channel shown in FIG. 10.
FIG. 11 is a schematic side view of the present invention with an optional sludge input system and an optional surface water input system.
FIG. 12A is a schematic side view of the adjustable-depth inlet water system of FIG. 12 with the inlet end of the inlet hose/pipe at a shallower depth.
FIG. 13 is a schematic side view of a second embodiment of the adjustable-depth inlet water system.
FIG. 25 is a perspective drawing of the first embodiment of the airlift pump shown in FIG. 24 with the treatment channel omitted for clarity.
FIG. 26 is a top view of the embodiment shown in FIG. 24.
FIG. 27 is a cross-section side view of a second embodiment of the airlift pump of the present invention shown in relation to a single treatment channel.
FIG. 28 is a cross-section front view of the embodiment shown in FIG. 27.

FIG. 29 is a side view of the second embodiment of the airlift pump shown in FIG. 27 with the treatment channel omitted for clarity.

REFERENCE NUMBERS

Figure 1:
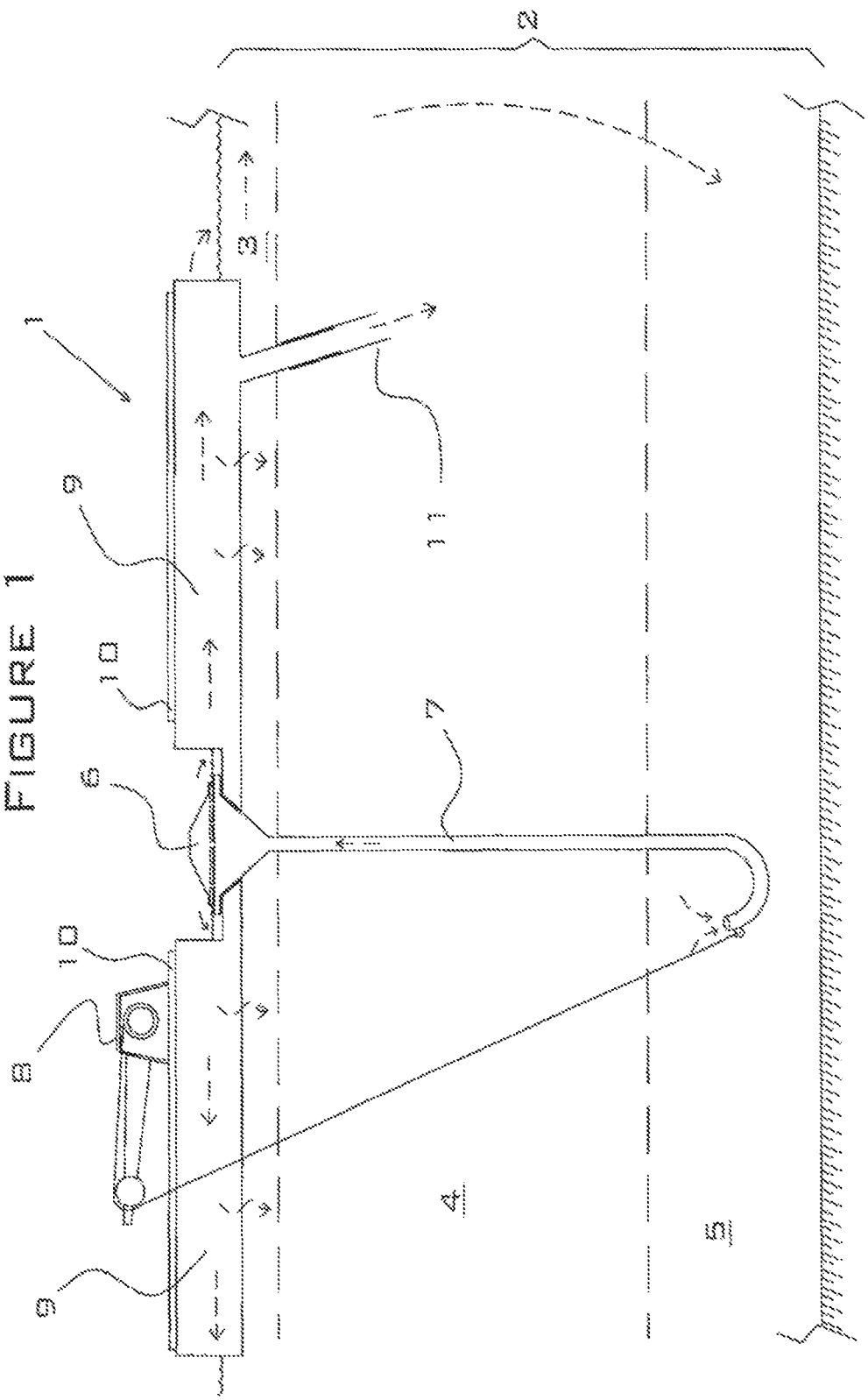
FIG. 1 is a schematic side view of the present invention.

1 Floating treatment streambed
2 Stratified water body
3 Surface layer
4 Intermediate layer
5 Deep layer
6 Circulation pump
7 Inlet hose/pipe
8 Inlet hose depth adjuster
9 Treatment channel
10 Walkway
11 Discharge pipe
12 Radial water flow from pump outlet
13 Treatment water
14 Permeable matrix
15 Periphyton layer
16 Flotation unit
17 Steel cable/polymer cord/polymer webbing
18 Impermeable channel liner
19 Top cover
20 Aquatic plant
21 Riparian/terrestrial plant
22 Wetland sod
23 Baffle
24 Permeable matrix channel filter
25 Absorbent channel filter
26 Outer support frame
27 Absorbent fill material
28 Floating treatment island
29 Tethering cable
30 Overhanging treatment bank
31 Side exit channel
32 Shorebird
33 Sludge input system
34 Surface water input system
35 Sludge pump
36 Sludge inlet pipe/hose
37 Surface water pump
38 Surface water inlet hose/pipe
39 Inlet end of water inlet hose/pipe
40 Cable/rope
41 Winch
42 Weight
43 Flexible joint
44 Inner pipe
45 Outer telescoping pipe
46 fluid seal
47 Union
48 Short extension pipe
49 Long extension pipe
50 Inlet filter
51 Outlet pipe depth adjuster
52 Upper stratified water body
53 Lower water body
54 Surface-layer inlet control valve
55 Intermediate-layer inlet control valve
56 Deep-layer inlet control valve
57 Manifold
58 Airlift pump, first embodiment
59 Channel inlet
60 Air compressor
61 Air supply hose
62 Diffuser
63 Deflector plate
64 Pivot rod
65 Lower attachment arm
66 Upper attachment arm
67 U-shaped hanger
68 Plate lock
69 Channel bottom
70 Channel sidewalls
71 Air bubbles
72 Channel outlet
73 Clamp
74 Collar
75 Circular plate
76 Adjusting handle
77 Retaining nut
78 Threaded bolt holes
79 Removable bolt
80 Bow rudder
81 Bow tiller
82 Gimbaled mount attachment
83 Upper support beam
84 Lower support beam
85 Vertical shaft
86 Rotatable sleeve
87 Stern tiller
88 Airlift pump, second embodiment
89 Rectangular cutout
90 Front pivot rod
91 Rear pivot rod
92 Holes for pivot rods
93 Front support boards
94 Rear support boards
95 Front of the deflector plate
96 Rear of the deflector plate
97 Angle support brackets
98 Cutouts in sidewall of channel
99 Extension pipe
100 Pipe supports

DETAILED DESCRIPTION OF INVENTION

The present invention produces several beneficial effects in water bodies. First, it increases the percentage of the water that can sustain fish populations by creating aerated deep zones and cooler shallow zones. Second, it clarifies the water by suppressing the growth of excess algae and other nuisance plants. Third, it promotes the growth of fish and other wildlife by converting excess nutrients into food sources which move up through the food chain. The oxygen-deficiency and eutrification problems described are mitigated by a combination of water circulation and bioremediation. The present invention provides a multi-step, integrated process which may be adjusted to create optimal remediation conditions for a particular site.

In general, the present invention involves: drawing in water that needs treatment from a specific depth zone; bringing that water to surface; optionally splitting it into multiple flow paths and optionally exposing it to air; optionally mixing the water with water from other zones; optionally mixing the water with organic sediment from the benthic zone of the water body; forcing the water to flow along one or more pathways that exposes it to a desired combination of mechanical filtration, sunlight (or absence of light), periphyton, beneficial microbes, aquatic, riparian and terrestrial plants, aeration (or lack of aeration), carbon, chemicals or compounds associated with pH adjustment; and discharging the treated water to a desired depth zone.

During the treatment process, the water may be sampled and analyzed, and the treatment process may be modified to improve the efficiency of the process for removing specific contaminants. When water is removed from a specific zone for treatment (e.g. when water is extracted from a deep anaerobic zone near the bottom of the water body), water from other zones naturally moves in to fill the vacated volume, thereby drawing fresh water into a previously stagnant zone. In addition, when water is pumped in a circulation pattern within a water body for an extended time period (e.g. for several days), the moving water induces movement in surrounding waters that magnifies the effect of the pumped circulation water. For example, some studies have shown that pumping water at a rate of 3000 gallons per minute (gpm) can induce a total flow of about 10,000 gpm.

The residence time of the treated water in a treatment channel may be adjusted as required by varying the length of the treatment channels, the thickness of the matrix on the bottom and sides of the treatment channel, and the pump flow rate. For example, some contaminants such as nitrate are removed relatively rapidly by denitrifying biofilm bacteria; therefore, the treatment channels can be relatively short and/or the flow rate of treatment water through the treatment channels can be relatively fast. Conversely, ammonia removal by autotrophic nitrifying bacteria is relatively slow and may require relatively long treatment channels and/or relatively slow flow velocity, resulting in more time for the water to be treated before it leaves the structure.

The pump rate of the present invention may be periodically varied for certain applications. For example, the pump may be run normally at 50% of maximum flow, and the flow may be temporarily increased to 100% of maximum flow for ten minutes, once per day. This periodic surging of the flow may be useful for purging excess periphyton growth from the growing surfaces in the treatment channels, thereby preventing undesirable fouling or plugging of the permeable components. In addition, this periodic surging may be useful for expelling aquatic animals such as insect larvae and crustaceans, which may serve as a valuable food source for fish that feed on the flushed-out flora and fauna.

The present invention may optionally be utilized as fish spawning habitat by providing relatively fast-moving, shallow water for species such as rainbow trout that normally cannot reproduce in lakes and ponds because their eggs require flowing water to survive. The present invention may also be used as growing habitat for fish species that prefer flowing water, and top covers may be added to protect the fish from birds of prey or, alternatively, to minimize algae growth in favor of biofilm development.

The structure of the present invention may be modified as required for optimal efficacy under varying seasonal conditions. For example, during the warmer summer months, bacterial biofilms and periphyton may tend to flourish and provide relatively rapid and complete removal of many contaminants such as nitrate and phosphorus; however, during the cooler winter months, contaminant removal by bacteria and periphyton may be less efficient, and the treatment provided by the invention may be improved by adding non-biological absorbent filters within the treatment channels as needed. Set forth below is a detailed description of the invention with specific reference to the figures.

FIG. 1 is a schematic side view of the present invention, which is referred to herein as a "floating streambed" or "FTS." As shown, the FTS 1 floats at the surface of a stratified water body 2, which is comprised of a surface layer 3, an intermediate layer 4, and a deep layer 5. The major components of the FTS 1 include a circulation pump 6 having an inlet hose or pipe 7, an inlet hose depth adjuster 8, multiple treatment channels 9 with walkways 10, and an optional discharge pipe 11. Water flow patterns produced by the circulation pump 6 are schematically represented by dashed arrows in the drawing. As the circulation water passes into and out of the FTS, this moving water induces additional water currents throughout the water body, which contribute to destratification of the water body.

When the circulation pump 6 is actuated, water from the deep layer 5 enters the intake pipe 7 and is discharged from the pump 6, where it subsequently enters the treatment channels 9. A portion of the water passes vertically downward through the permeable bottom of the treatment channels 9 and is discharged into the surface layer 3. Another portion of the water passes horizontally through (along) the treatment channels 9 and is discharged into the surface layer 3. A final portion of the water may optionally be allowed to flow through the optional discharge pipe 11 and then be discharged into the intermediate layer 4.

As the water passes through the treatment channels 9, it is mechanically filtered and biologically treated to remove nutrients and other contaminants prior to being discharged into the water body 2. As indicated by the dashed arrows, the FTS causes water to circulate between the surface layer 3, the intermediate layer 4, and the deep layer 5. In order to maximize efficiency, the circulation pump is preferably designed to produce a relatively high flow rate at a relatively low output pressure (i.e., a "high flow rate, low head" pump). One acceptable commercially available pump for this application is the BLUE FROG® pump manufactured by Absolute Aeration of Lexington, Nebr. This pump is reported to have an output of 5,000 gallons per minute at an output head of about six inches, and is powered by a 3-horsepower, variable speed, 230-VAC motor.

The present invention is constructed so that the depths of the intake and discharge are adjustable. Details of the adjustable-depth components are shown in FIGS. 9-13. Details of the structure and operation of the treatment channel 9 are presented in FIGS. 2-7.

Figure 2:
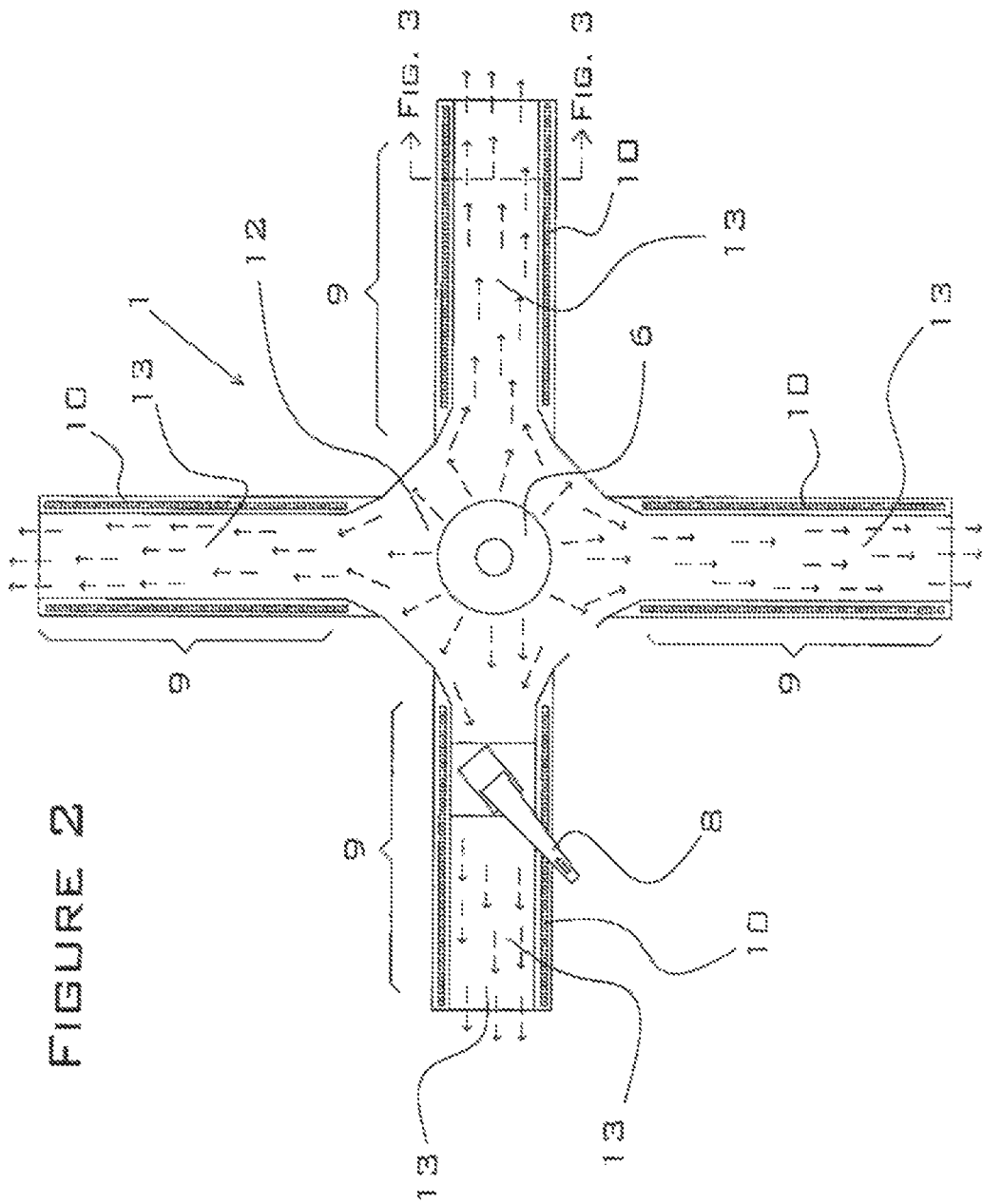
FIG. 2 is a schematic top view of the present invention.

FIG. 2 is a schematic top view of the present invention. In this embodiment, the present invention comprises four independent treatment channels 9, an inlet hose depth adjuster 8, and a circulation pump 6. Walkways 10 are shown along both sides of each treatment channel 9. The purpose of the walkways 10 is to allow personnel access for operation, inspection and servicing of the treatment channels 9. Water flow patterns for the surface flows through the FTS 1 are indicated by the dashed arrows. As shown, a portion of the radial water flow 12 from the circulation pump 6 is diverted into each of the treatment channels 9. The water flowing through the treatment channels 9 is referred to as the treatment water 13. Although FIG. 2 shows an FTS with four treatment channels, the number of treatment channels can range from one to ten or more.

The treatment efficacy may be optimized for a specific set of contaminants by adjusting the pump flow rate, the dissolved oxygen concentration, the number and type of channel filters, and the mixing additives (surface water and benthic sludge). The dissolved oxygen in the treatment water may be increased by bubbling air into the treatment water within the inlet pipe or within the treatment channels. Conversely, if the desire is to maintain low dissolved oxygen concentrations in the treatment water (e.g. for biological denitrification), then the treatment channels may be covered with a low-permeability top cover to minimize exposure of the treatment water to atmospheric oxygen.

When the present invention comprises multiple treatment channels 9, each treatment channel 9 may be configured differently. For example, one treatment channel 9 may be optimized for aerobic removal of ammonia and organic carbon by having a top surface open to the atmosphere and sunlight, while simultaneously, another treatment channel 9 may be optimized for anoxic removal of nitrate by installing an impermeable top cover that excludes atmospheric air.

Figure 3:
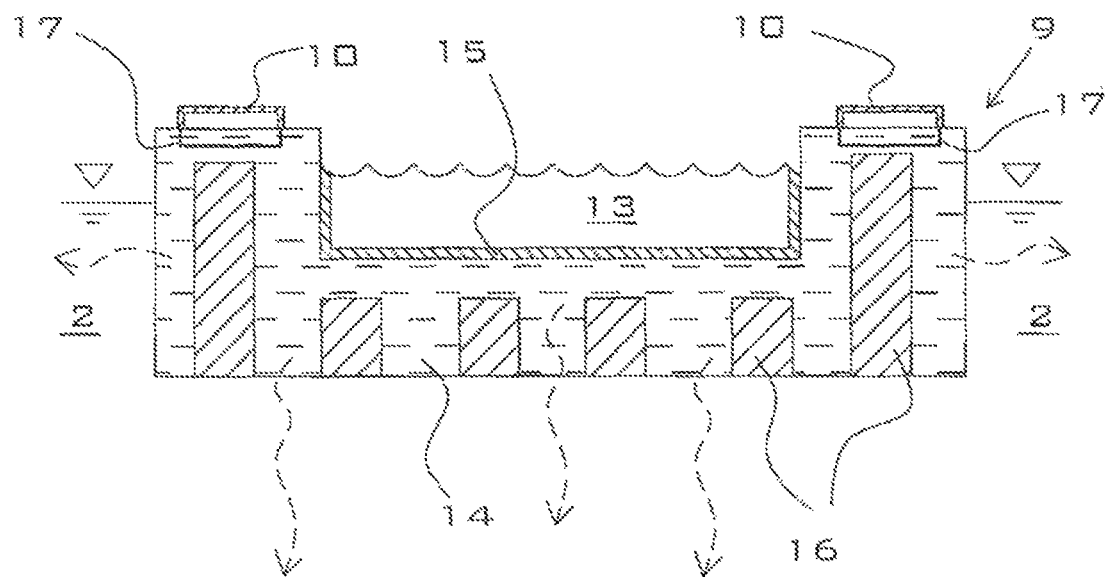
FIG. 3 is a schematic cross-section view of a first embodiment of a treatment channel.

FIG. 3 is a schematic cross-section view of a first embodiment of a treatment channel 9. In this embodiment, walkways 10 are positioned on either side of the treatment channel 9. This figure also shows the permeable matrix 14, the periphyton layer 15, the treatment water 13, and the flotation units 16. The treatment channel 9 is shown floating in stratified water body 2. The dashed arrows in FIG. 3 represent the portion of treatment water 13 that percolates through the periphyton layer 15 and the permeable matrix 14. Note that water may percolate downward through the bottom of the treatment channel and also horizontally through the sides of the treatment channel. The periphyton layer 15 grows naturally on the bottom and sides of each treatment channel under typical ambient pond conditions.

Periphyton is typically a mixture of algae, cyanobacteria, bacteria, and their residue and detritus. Because algae require sunlight to survive, the periphyton layer 15 will typically be restricted to the outer surfaces of the permeable matrix 14. Bacterial biofilms do not require sunlight and are well suited for colonization within the interior zones of the permeable matrix 14; therefore, as water flows through the periphyton layer 15 and then through the permeable matrix 14, nutrients and other contaminants are mechanically filtered and biologically converted by algae and bacteria. The sides and bottom of the channel may optionally be constructed with a removable liner (not shown) to facilitate removal and harvest of periphyton, if desired.

The permeable matrix 14 is preferably comprised of non-woven polymer fibers. One acceptable commercially available matrix product is comprised of polyester fibers that are intertwined to form a randomly oriented web or "blanket" with a standard thickness and width. One manufacturer of suitable matrix material is Americo Manufacturing Company, Inc. of Acworth, Ga. In one preferred embodiment, the matrix is comprised of 200-denier polyester fibers that are intertwined to form a blanket approximately 1¾ inch thick by 56 inches wide. The matrix is produced in a continuous strip and cut to lengths of approximately 90 feet for shipping. The nominal weight of the blanket is 41 ounces per square yard. The nominal weight of the polyester fibers within the blanket is 26 ounces per square yard. A water-based latex binder is preferably baked onto the fibers to increase the stiffness and durability of the blanket. Relatively thick blocks of matrix material may be formed by stacking and bonding multiple layers of the matrix blanket to the desired thickness. Suitable bonding means include injecting cure-in-place polyurethane foam (either open cell or closed cell) to the stacked layers, spraying hot melt glue between the layers prior to stacking, and stitching the stacked layers together with polymer cords.

The characteristics of the matrix can be adjusted by varying the construction materials and manufacturing process. For example, the diameter of the fibers may vary from approximately 6 to 300 denier. Coarse fibers result in a relatively stiff matrix with relatively small surface area for colonizing microbes, and fine fibers result in a relatively flexible matrix with a relatively large surface area for colonizing microbes. The latex binder can be applied relatively lightly or relatively heavily to vary the durability and weight of the matrix, and dye or pigment can be added to the binder to produce a specific color of matrix. The latex-coated fibers provide an excellent growth substrate for colonization by beneficial microbes. The thickness of the blanket can be adjusted from approximately ¼-inch to two inches using current manufacturing techniques. It is anticipated that thicker blankets will be produced in the future, and these thicker blankets (for example, three to 12 inches) will be used when they become available.

A second acceptable material for manufacturing non-woven matrix is post-consumer carpet (i.e., recycled scrap carpet) that has been chopped and/or shredded to produce fibers made from polypropylene, polyethylene and/or nylon. The fibers are then compressed to the desired bulk density and optionally treated with a binder, in a process similar to that described for the polyester fiber matrix above.

The hydraulic conductivity of the permeable matrix preferably ranges from about 0.1 to 10.0 feet/second. The thickness of the permeable matrix along the bottom and sides of the treatment channel preferably ranges from about four to 36 inches. Internal buoyancy is integrated within the permeable matrix 14 by injecting uncured liquid polyurethane resin under pressure into the matrix 14. The polyurethane resin then expands and cures in place within the matrix, thereby forming flotation units 16. The injection pressure, resin temperature, and injection shot volume of the foam injection machine are preferably preset so as to provide the desired final volume of cured buoyant foam. The foam can be installed so as to provide a continuous volume throughout the matrix, or, alternately, it can be installed so as to provide individual buoyant sections of foam within the matrix that are separated by non-foamed zones of matrix.

FIG. 3 shows flotation units 16 that have been formed by injecting resin into the bottom side of the permeable matrix 14; however, the resin may optionally be injected from the top, sides, or bottom of the matrix, or from a combination of these surfaces. In one preferred embodiment, the matrix 14 is constructed so as to have a thickness of approximately 24 inches on the sidewall of the channel and eight inches beneath the channel. Uncured foam resin having a nominal cured density of 2.5 pounds per cubic foot (pcf) is injected into the bottom of the matrix and penetrates to the top surface of the matrix. For the eight-inch thick portion of the matrix 11, a four-second shot of uncured foam is injected with a pressure of approximately 70 pounds per square inch, resulting in a cured mass of foam approximately spherical in shape, having a diameter of approximately eight inches. The sphere has a density of approximately 5.8 pcf consisting of approximately 2.5 pcf polyurethane foam that is reinforced with matrix having a density of approximately 3.3 pcf. For the 24-inch thick portion of the matrix 14, the resin is injected via a 12-inch long needle that is pushed into the matrix from the bottom edge. The needle is slowly withdrawn as the foam is injected during an eight-second shot, resulting in a cylindrical cured mass of foam having a diameter of about eight inches and a height of about 16 inches.

The density of the polyurethane foam can be adjusted by varying the chemical formula of the resin, or by varying the application parameters such as temperature and pressure. Practical foam densities for the flotation units 16 range from about 1.0 to 25.0 pcf. The lighter foams are desirable where high buoyancy and low cost are important—for example, for decorative water garden islands. The heavier density foams are preferable where high strength and durability are important—for example, where the FTS may be subjected to boat impacts or heavy wave action. The foamed zones of the matrix may be optionally coated with a spray-on polyurethane outer covering to increase durability. Alternately, self-skinning foams that cure with a tough outer cover may be used to provide extra durability for the flotation units 16.

The walkways 10 are preferably comprised of molded, fiberglass-reinforced plastic grating. One acceptable commercially available product is GRIDMARK™ grating manufactured by American Grating LLC of Henderson, Nev. This grading is available in dimensions of ten feet long by three feet wide by 1.5 inches tall and is coated with a non-slip surface. The walkways may also be comprised of treated lumber or polymer-resin boards. The walkways 10 are preferably attached to the matrix 14 by steel cables, polymer cords or webbing 17 that either pass around or through the matrix and walkways.

Figure 4:
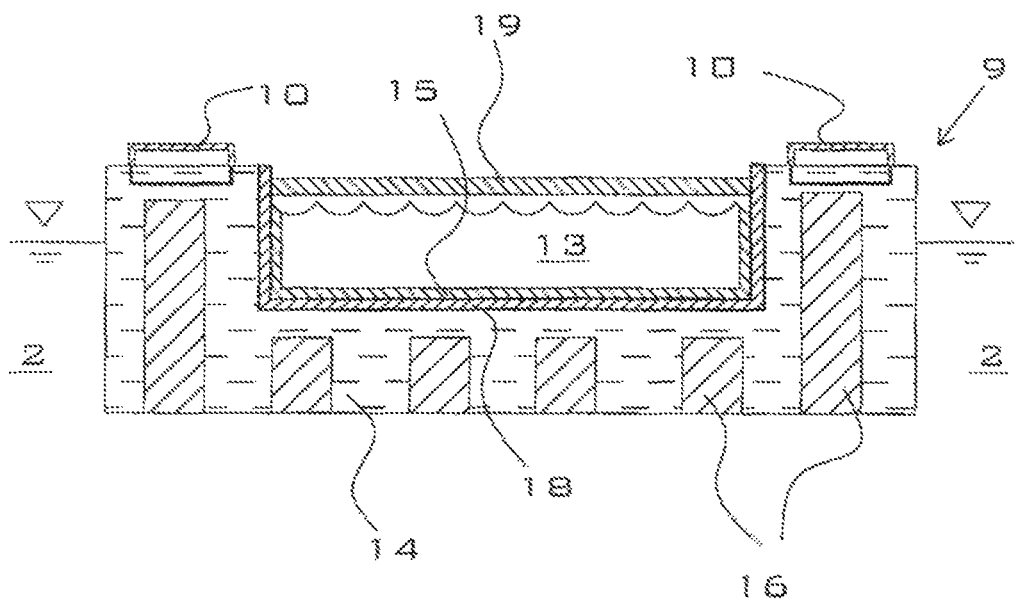
FIG. 4 is a schematic cross-section view of a second embodiment of a treatment channel incorporating an impermeable channel liner and top cover.

FIG. 4 is a schematic cross-section view of a second embodiment of a treatment channel 9, which incorporates an optional impermeable channel liner 18 and an optional top cover 19. With this embodiment, percolation of the treatment water 13 through the permeable matrix 14 is prevented. This embodiment is preferred for applications in which it is desirable to maximize the time that the treatment water remains within the channel for treatment or for applications in which the channel contains in-stream filters.

The impermeable channel liner 18 may be comprised of materials that are suitable for use as pond liners—for example, polyethylene, polyvinyl chloride, EDPM rubber, or polypropylene sheeting. The impermeable liner material is preferably resistant to degradation by ultraviolet sunlight and is resistant to punctures and tears. The top cover 19 may be comprised of gas-impermeable polymer sheeting to prevent the treatment water 13 from coming into contact with atmospheric oxygen (exclusion of oxygen is desirable for some microbial processes such as denitrification), or it may be comprised of opaque fabric or polymer sheeting that excludes sunlight and thereby prevents the growth of algae and plants while allowing the growth of beneficial bacteria (which is desirable for situations in which plugging of the matrix by periphyton may be a problem), or it may be made of polymer or natural-fiber netting that excludes predatory birds, thereby providing secure habitat for fish and wildlife residing within the treatment water 13.

Figure 5:
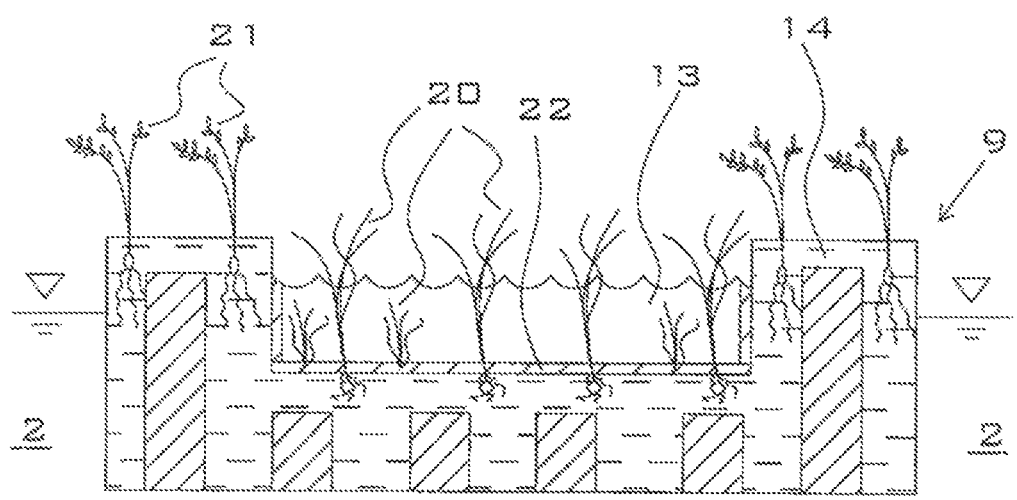
FIG. 5 is a schematic cross-section view of a third embodiment of a treatment channel incorporating aquatic, riparian and/or terrestrial plants.

FIG. 5 is a schematic cross-section view of a third embodiment of a treatment channel 9, which comprises aquatic plants 20 and riparian or terrestrial plants 21. (As shown in this figure, the plants may be located within the treatment channel itself or in the matrix 14 on either side of the treatment channel.) The plants may be used to increase the removal rate of excess nutrients from the treatment water 13 via phytoextraction. The plants 20, 21 may also contribute to the aesthetic appeal of the structure. Wetland sod 22 or bedding plants or plugs may be used to grow the aquatic plants 20. Wetland sod is typically comprised of aquatic and riparian plants that are rooted into coir or jute blankets. One supplier of wetland sod is Great Bear Restoration of Hamilton, Mont. If wetland sod is utilized, it may be attached to the treatment channel bottom. Grass sod, bedding plants and/or seeds may be used to grow the riparian or terrestrial plants 21. The bedding plants or plugs and seeds may optionally be inserted into precut holes (not shown) within the permeable matrix 14. The grass sod is laid over the top surfaces of the permeable matrix 14 that are above waterline. The sod (wetland or grass) may be attached to the permeable matrix 14 with landscaping pins (not shown), which will hold the sod in place until it becomes attached by roots growing into the permeable matrix 14. Optional growth medium (not shown) such as peat, bedding soil or rock wool, or combinations of these materials, may be used to fill the holes prior to planting.

FIG. 6 is a schematic top view of a fourth embodiment of a treatment channel 9 that comprises three-dimensional baffles 23. These baffles 23 are used to produce longer flow paths for treatment water flowing though the treatment channel 9, thereby increasing the exposure of the treatment water 13 to periphyton growing on the wetted surfaces of the treatment channel that are exposed to sunlight and bacterial biofilms growing on the surfaces of the fibers within the permeable matrix 14. The baffles are preferably comprised of permeable matrix material similar to the permeable matrix 14, which allows a portion of the treatment water to flow horizontally through the battles 23 and the remainder of the water to flow around the baffles 23. The permeable baffles preferably have a hydraulic conductivity ranging from about 0.1 to 10.0 feet/second and a thickness ranging from about 0.5 to 4.0 feet in the direction of flow. The baffles may be attached to the sides and bottom of the treatment channel 9 with closed cell polyurethane foam, open cell polyurethane foam, or hot melt glue.

Referring to FIG. 6, water flow patterns around and through the permeable baffles are shown by dashed arrows in the figure. The portion of water that flows through the baffles 23 is exposed to periphyton on the baffle surfaces and also to microbial biofilms growing within the baffles, thereby resulting in additional removal of nutrients and other contaminants from the treatment water via a combination of mechanical and biological filtration. Also shown in this figure are optional walkways 10. These walkways are useful for providing access to measure water quality parameters such as dissolved oxygen and temperature and to check for plugging or other problems.

FIG. 6A is a schematic cross-section view of the treatment channel 9 and one of the baffles shown in FIG. 6. As shown in this figure, the battle 23 extends across a portion of the channel width and also above the waterline within the channel. A periphyton layer 15 grows along all of the wetted surfaces that are exposed to sunlight.

FIG. 7 is a schematic top view of a fifth embodiment of a treatment channel 9 that comprises two types of optional channel filters, namely, a permeable matrix channel filter 24 and an absorbent channel filter 25. The filters are preferably used in combination with an impermeable channel liner (not shown in FIG. 7) that covers the channel sides and bottom (see FIG. 4), thereby resulting in the entire water flow of the treatment channel 9 passing through the channel filters 24 and 25 rather than having a portion of the water passing around the filters 24 and 25 and/or through the sides and bottom of the treatment channel. The filters may be attached to the sides and bottom of the treatment channel 9 with closed cell polyurethane foam, open cell polyurethane foam, or hot melt glue. The two types of filters may optionally be deployed together sequentially, as shown in the figure, or alone. The permeable matrix channel filter 24 is preferably comprised of permeable matrix material that is similar or identical to the permeable matrix material 14 that has been described previously in connection with FIGS. 3 and 4. The absorbent channel tilter 25 is described in conjunction with FIG. 7A.

FIG. 7A is a perspective view of an absorbent channel filter 25 that comprises an outer support frame 26 and an absorbent fill material 27. The outer support frame 26 is preferably comprised of sheets of permeable matrix material that is similar or identical to the permeable matrix material 14 that has been described previously in connection with FIGS. 3 and 4. These sheets are joined with closed cell polyurethane foam, open cell polyurethane foam, or hot melt glue.

In a first embodiment, the absorbent fill material is comprised of polymer sponge material that has been manufactured so as to trap organic particles and dissolved metals. Examples of commercially available sponge materials that are suitable for this application include the SMART SPONGE® products from AbTech Industries, Inc. of Scottsdale, Ariz. and the FORAGER™ Sponge products from Dynaphore, Inc. of Richmond, Va. In a second embodiment, the absorbent fill material is comprised of granular activated carbon, which is known to have the ability to trap numerous organic and inorganic contaminants. Optionally, slow-release pH modifiers such as granular calcium carbonate may be added to the absorbent fill material. The outer support frame 26 prevents the pieces of absorbent material 27 from being swept away by the moving treatment water and facilitates the removal and replacement of the absorbent material 27 when it becomes saturated with trapped contaminants. The frame 26 may be attached to the sides and floor of the treatment channel 9 with closed cell polyurethane foam, open cell polyurethane foam, or hot melt glue.

Although not shown in the drawing, the absorbent filter 25 may include a lid that helps encapsulate the absorbent fill material 27. The lid may be comprised of a sheet of permeable matrix material that is similar or identical to the permeable matrix material 14 that has been described previously in connection with FIGS. 3 and 4.

FIG. 8 is a schematic cross-section side view of a sixth embodiment of a treatment channel 9 that comprises an in-stream floating treatment island 28. The floating treatment island 28 comprises permeable matrix 14, flotation units 16, tethering cables 29, optional aquatic plants 20, and optional terrestrial or riparian plants 21. Tethering cables 29 are used to maintain the floating treatment island at a fixed position within the treatment channel 9. The tethering cables we preferably constructed from polymer rope or webbing or stainless steel wire rope. The tethering cables 29 preferably run through the permeable matrix 14 of the floating island 28 and are attached to the walkways 10.

One beneficial purpose of the floating island 28 is to enhance the removal of nutrients and other contaminants from the treatment water 13. A first portion of the treatment water 13 within the treatment channel 9 flows through the permeable interior region of floating treatment island 28, where biofilms growing on the internal fibers of the permeable matrix 14 and roots from the plants 20 and 21 growing within the permeable matrix 14 remove a portion of the nutrients and other contaminants from the treatment water 13. A second portion of the treatment water 13 flows around and underneath the floating island 28, where the exposed roots of the plants 20 and 21 remove another portion of the nutrients and other contaminants from the treatment water 13. A second beneficial purpose of the floating island 28 is to provide shade and protective cover for fish and other wildlife that use the treatment channel 9 for living and/or feeding habitat.

FIG. 9 is a schematic cross-section side view of a seventh embodiment of a treatment channel 9, which comprises an overhanging treatment bank 30. The overhanging treatment bank is similar in construction and operation to the floating treatment island described in reference to FIG. 8 above. It comprises permeable matrix 14, flotation units 16, tethering cables 29, optional aquatic plants 20, and optional terrestrial or riparian plants 21. Tethering cables 29 are used to maintain the overhanging treatment bank against one side of the treatment channel 9 at a fixed position and are preferably attached to the walkway 10.

One beneficial purpose of the overhanging treatment bank 30 is to enhance the removal of nutrients and other contaminants from the treatment water 13. A first portion of the treatment water 13 within treatment channel 9 flows through the permeable interior region of overhanging treatment bank 30, where biofilms growing on the internal fibers of the permeable matrix 14 and roots from the plants 20 and 21 growing within the permeable matrix 14 remove a portion of the nutrients and other contaminants from the treatment water 13. A second portion of the treatment water 13 flows around and underneath the overhanging treatment bank 30, where the exposed roots of the plants 20 and 21 remove another portion of the nutrients and other contaminants from the treatment water 13. A second beneficial purpose of the overhanging treatment bank 30 is to provide shade and protective cover for fish and other wildlife that use the treatment channel 9 for living and/or feeding habitat.

FIG. 10 and FIG. 10A are a schematic top view and a schematic cross-section side view, respectively, of an eighth embodiment of a treatment channel 9 that incorporates a side exit channel 31. The side exit channel 31 is constructed by lowering the elevation of a side wall of the treatment channel 9 so that a portion of the treatment water 13 escapes from the treatment channel 9, as shown by the curved flow arrow in FIG. 10. Although only one side exit channel is shown for clarity, a treatment channel 9 may contain a plurality of side exit channels 31. The purpose of the side exit channel 31 is to provide a relatively shallow stream section compared to the stream depth in the treatment channel 9, as shown in FIG. 10A. The shallow water within the side exit channel 31 provides an attractive feeding habitat for shorebirds 32 such as sandpipers, which feed on scuds and insects that live in the periphyton layer 15 that coats the bottom of the exit side channel 31. Optionally, the flow rate from the circulation pump can be periodically reduced so that the water flow in the side exit channel 31 is reduced and/or stopped. This periodic cycling of the water level in the exit side channel may be particularly attractive to species of shorebirds that naturally feed along the tide line or wave line of beaches.

FIG. 11 is a schematic side view of the present invention with an optional sludge input system and an optional surface water input system. The sludge input system 33 comprises a sludge pump 35 and a sludge inlet pipe or hose 36. The inlet of sludge pipe or hose 36 is set at the bottom of the water body 2. The purpose of the sludge input system 33 is to provide bottom sludge for mixing with the treatment water prior to treatment. Because sludge can be relatively rich in organic carbon, it can be used to provide carbon used for microbial processes such as denitrification, which requires a carbon source in order to convert nitrate to nitrogen gas. The sludge input system 33 can also be used to treat sludge that is contaminated with metals or other contaminants, in cases where such treatment is desired.

The surface water input system 34 comprises a surface water pump 37 and a surface water inlet hose or pipe 38 with an inlet end within the surface layer 3 of the water body. The purpose of the surface water input system 34 is to provide surface water for mixing with the treatment water prior to treatment. Because surface water can be relatively high in dissolved oxygen and is typically warmer than water from the intermediate zone 4 or the deep zone 5, adding surface water to deeper waters prior to treatment may increase the reaction rate of certain aerobic microbial processes such as autotrophic nitrification or heterotrophic conversion of organic carbon.

In one hypothetical example, deep-zone water contains high concentrations of nutrients and is at a relatively low temperature, while shallow-zone water is relatively nutrient-free and warm. By mixing the waters form the two zones prior to treatment, the biofilms in the permeable matrix 14 are exposed to moderate concentrations of nutrients at moderate temperatures. Because the nutrient removal rate by biofilms is proportional to temperature, the removal rate of the blended water is greater than that of the cold water. In a second hypothetical example, the deep zone contains high concentrations of ammonia and phosphate but a low concentration of oxygen, while the shallow zone (or surface layer) contains a relatively high concentration of dissolved oxygen. By blending the waters from the two zones, the biofilms are exposed to nutrients plus oxygen, and the oxygen allows aerobic microbes to convert nutrients to biofilm and then to periphyton at a faster rate compared to anaerobic film conversation.

Figure 12:
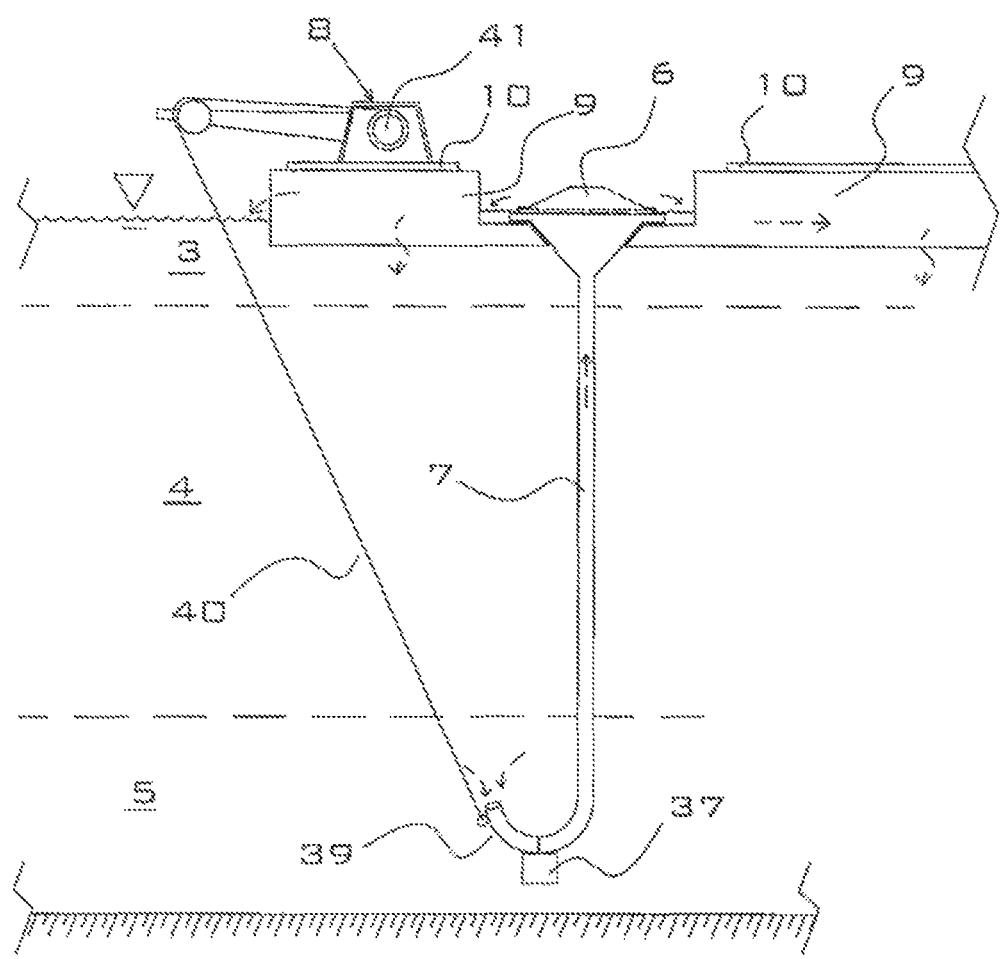
FIG. 12 is a schematic side view of a first embodiment of the adjustable-depth inlet water system shown in FIG. 1.

FIGS. 12 and 12A are schematic side views of a first embodiment of the adjustable-depth inlet water system previously shown in FIG. 1. As shown in FIG. 12, the inlet end 39 of the inlet hose or pipe 7 is connected to the terminal end of a cable or rope 40 that is spooled onto a winch 41, which is a component of the inlet hose depth adjuster 8. For this embodiment, the inlet hose or pipe 7 is manufactured so as to have longitudinal flexibility combined with circumferential stiffness, which allows it to bend without collapsing. In FIG. 12, the inlet end 39 of the inlet hose or pipe 7 is shown at approximately maximum depth. When the winch 41 is turned clockwise by hand or motor (not shown), the cable, rope or webbing 40 is spooled onto the winch 41, thereby raising the inlet end 39 of inlet hose 7 to a shallower depth, as shown in FIG. 12A. By this means, the inlet end 39 may be set at any desired depth depending on site conditions.

An optional weight 42 may be installed onto the inlet hose 7, if required, to keep it from floating. One suitable type of hose material for this embodiment is PVC blower/vacuum hose that is reinforced with a molded-in spiral steel wire. An example of a commercially available hose of this type is McMaster-Carr part #5666K48. The weight 42 is preferably comprised of concrete or metal. The weight 42 is preferably connected to the inlet hose or pipe 7 by a band or strap comprised of nylon or steel.

FIG. 13 is a schematic side view of a second embodiment of an adjustable-depth inlet water system. As shown in this embodiment, the inlet hose or pipe 7 is fitted with a flexible joint 43. When the cable or rope 40 is retracted by turning the winch 41 clockwise, the inlet end 39 of the inlet hose or pipe 7 is raised to a shallower depth. For this embodiment, rigid pipe is the preferred material for the inlet hose or pipe 7. One acceptable material for the inlet hose or pipe 7 of this embodiment is Schedule 40 PVC pressure pipe. An optional weight 42 may be connected to inlet hose or pipe 7, as shown, to prevent it from floating. The flexible joint 43 is preferably comprised of rubber hose or steel-reinforced PVC hose.

Figure 14:
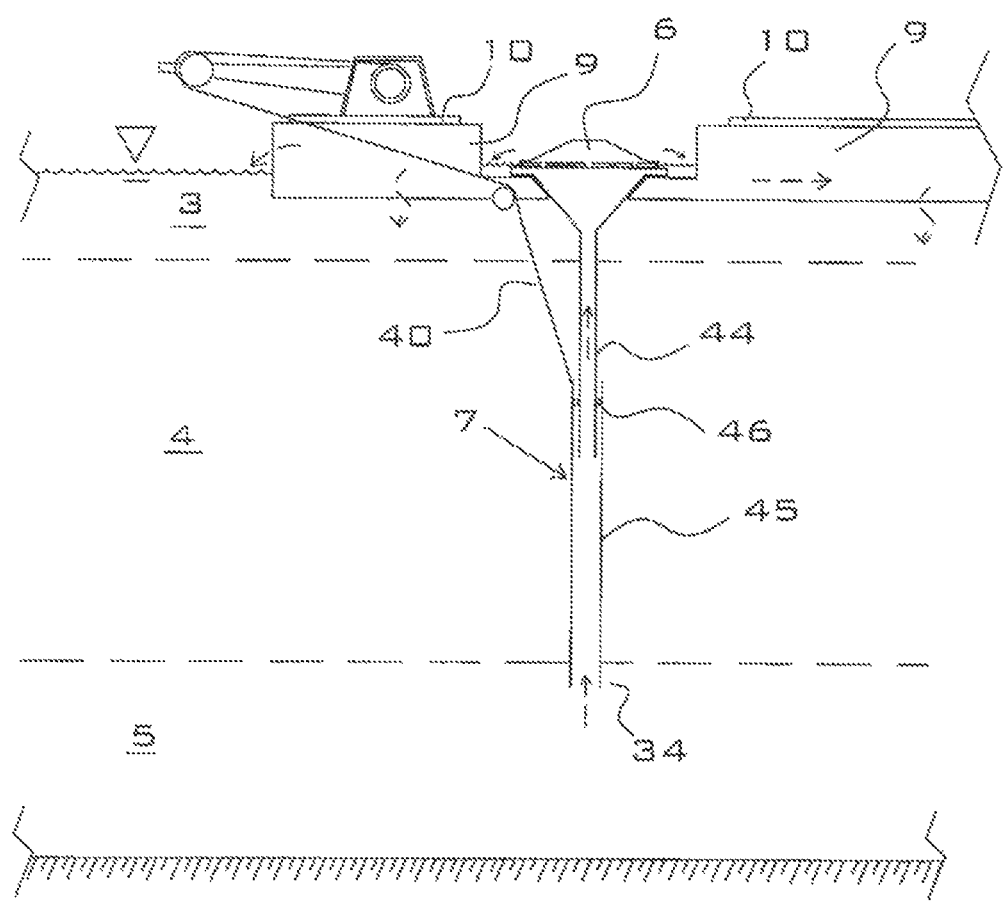
FIG. 14 is a schematic side view of a third embodiment of the adjustable-depth inlet water system.

FIG. 14 is a schematic side view of a third embodiment of an adjustable-depth inlet water system. In this embodiment, the inlet hose or pipe 7 is comprised of an inner pipe 44, a telescoping outer pipe 45, and a fluid seal 46. When the cable or rope 40 is retracted, the telescoping outer pipe 45 moves vertically upward around the inner pipe 44, thereby raising the inlet end 39 of the inlet hose or pipe 7 to a shallower depth.

Figure 15:
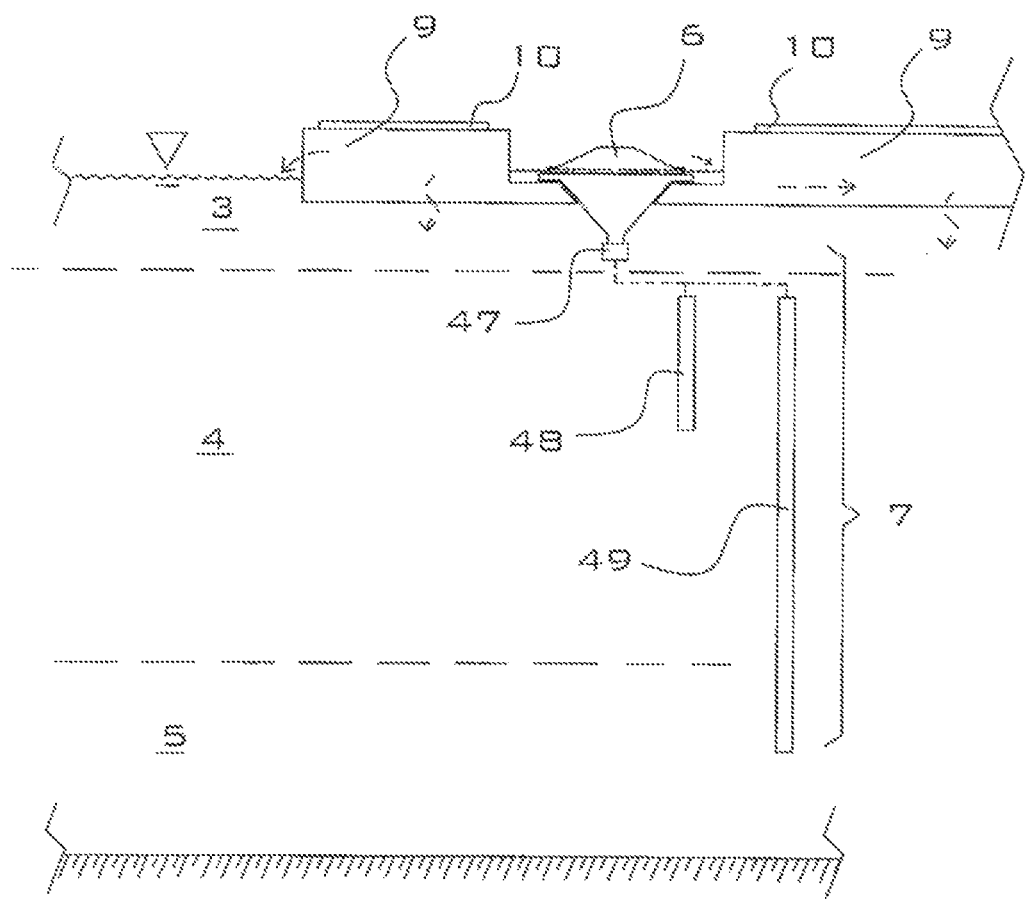
FIG. 15 is a schematic side view of a fourth embodiment of the adjustable-depth inlet water system.

FIG. 15 is a schematic side view of a fourth embodiment of the adjustable-depth inlet water system. In this embodiment, the inlet hose or pipe 7 comprises a union 47, a short extension pipe 48, and a long extension pipe 49. The inlet depth is adjusted by manually installing the long extension pipe 49 onto the union 47 for maximum inlet depth, by manually installing the short extension pipe 48 onto the union 47 for intermediate inlet depth, or by installing no pipes onto the union 47 for shallow inlet depth (as shown in the figure).

Figure 16:
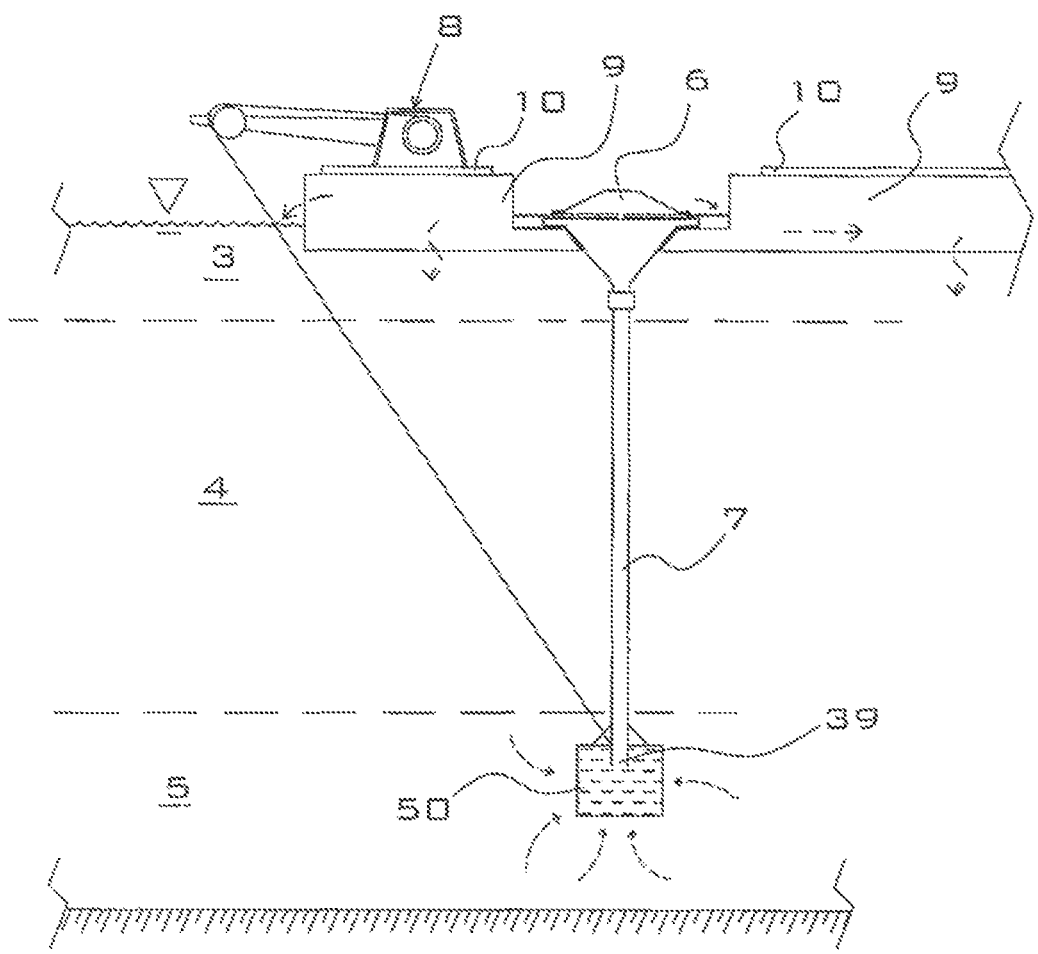
FIG. 16 is schematic side view of the adjustable-depth inlet water system of FIG. 12 with an optional inlet filter.

FIG. 16 is a schematic side view of an adjustable-depth inlet water system comprising an optional inlet filter 50 that surrounds the inlet end 39 of inlet hose 7. The dashed arrows in the drawing represent the flow of untreated water into the inlet filter 50. The inlet filter 50 is preferably comprised of permeable matrix material that is similar or identical to the permeable matrix material 14 that comprises the treatment channel 9 shown in FIGS. 3 and 4. The inlet filter 50 may be manufactured in any prismatic or freeform shape and is preferably attached to the inlet hose or pipe 7 by nylon webbing straps (not shown).

A first purpose of the inlet filter 50 is to provide initial mechanical filtration of solids (e.g. leaves and twigs) from the inlet water prior to the inlet water being exposed to the treatment channels 9 shown in FIGS. 3 and 4. A second purpose of the inlet filter 50 is to provide additional microbial colonizing surface for enhanced biological treatment of the inlet water as it passes through the inlet filter 50. The inlet filter 50 may be raised to the surface periodically as required for cleaning or replacement via the inlet hose depth adjuster 8. In preferred embodiments, the volume of the inlet filter 45 may range from about 1 cubic foot to 500 cubic feet, depending on the volumetric flow rate of the inlet water, the level of contamination present in the inlet water, and the amount of pre-filtration that is desired for a particular application. In an alternative embodiment (not shown), matrix material 14 may be packed within the interior of the inlet hose or pipe 7, thereby replacing or assisting the inlet filter 50.

Figure 17:
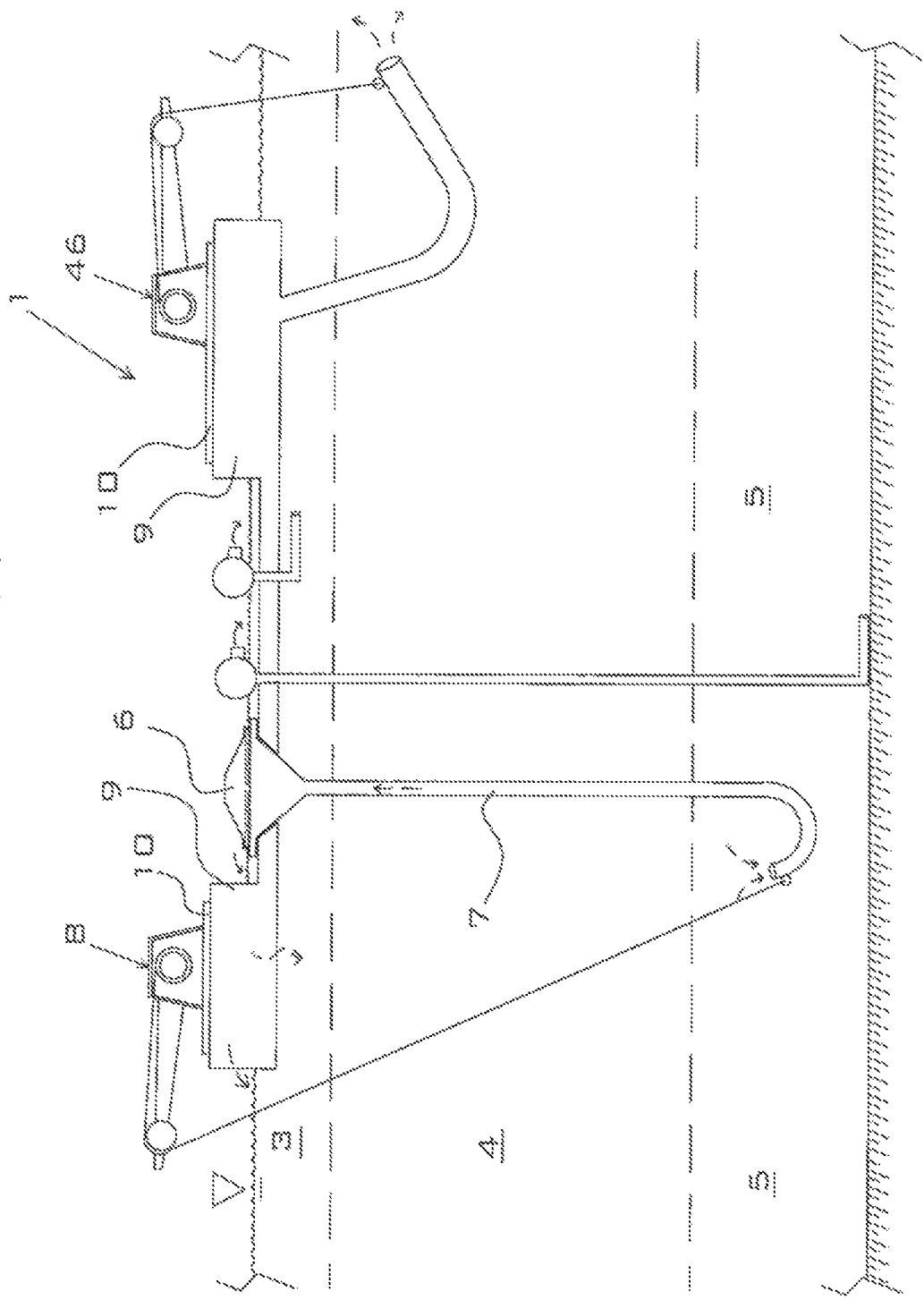
FIG. 17 is a schematic side view of the present invention with an inlet hose depth adjuster and an outlet hose depth adjuster.

The mechanisms shown in FIGS. 12-16 for adjusting the depth of the inlet hose or pipe could be similarly employed to adjust the depth of the outlet pipe. For example, FIG. 17 is a schematic side view of an FTS 1 that comprises an inlet hose depth adjuster 8 and an outlet pipe depth adjuster 51, in which both the inlet hose depth adjuster 8 and the outlet hose depth adjuster 51 are similar to the inlet hose depth adjuster 8 shown previously in FIG. 12.

Although the depth adjustment systems shown in FIGS. 12-16 are illustrated as being manually operated, all of these embodiments could optionally be controlled automatically using computers to monitor water quality at the inlets and outlets and correspondingly set the pipe depth levels for optimal treatment efficacy. Also optionally, dissolved oxygen could be added to the treatment water by injecting air into the inlet hose or pipe 7 (not shown), or air could be added to one or more individual treatment channels using bubblers placed at the upstream ends of the treatment channels (not shown). One example of a commercially available bubbler is the PLACT™ aerator system manufactured by AgriDrain Corporation of Adair, Iowa.

In an alternate embodiment, water circulation through the treatment channels may be provided by gravity power rather than by the circulation pump described in connection with the previous figures. The gravity-flow embodiment may be particularly useful for treatment sites where there exist two nearby bodies of water, and in which the body of water containing the contaminated water has a higher water level than the other body of water.

Figure 18:
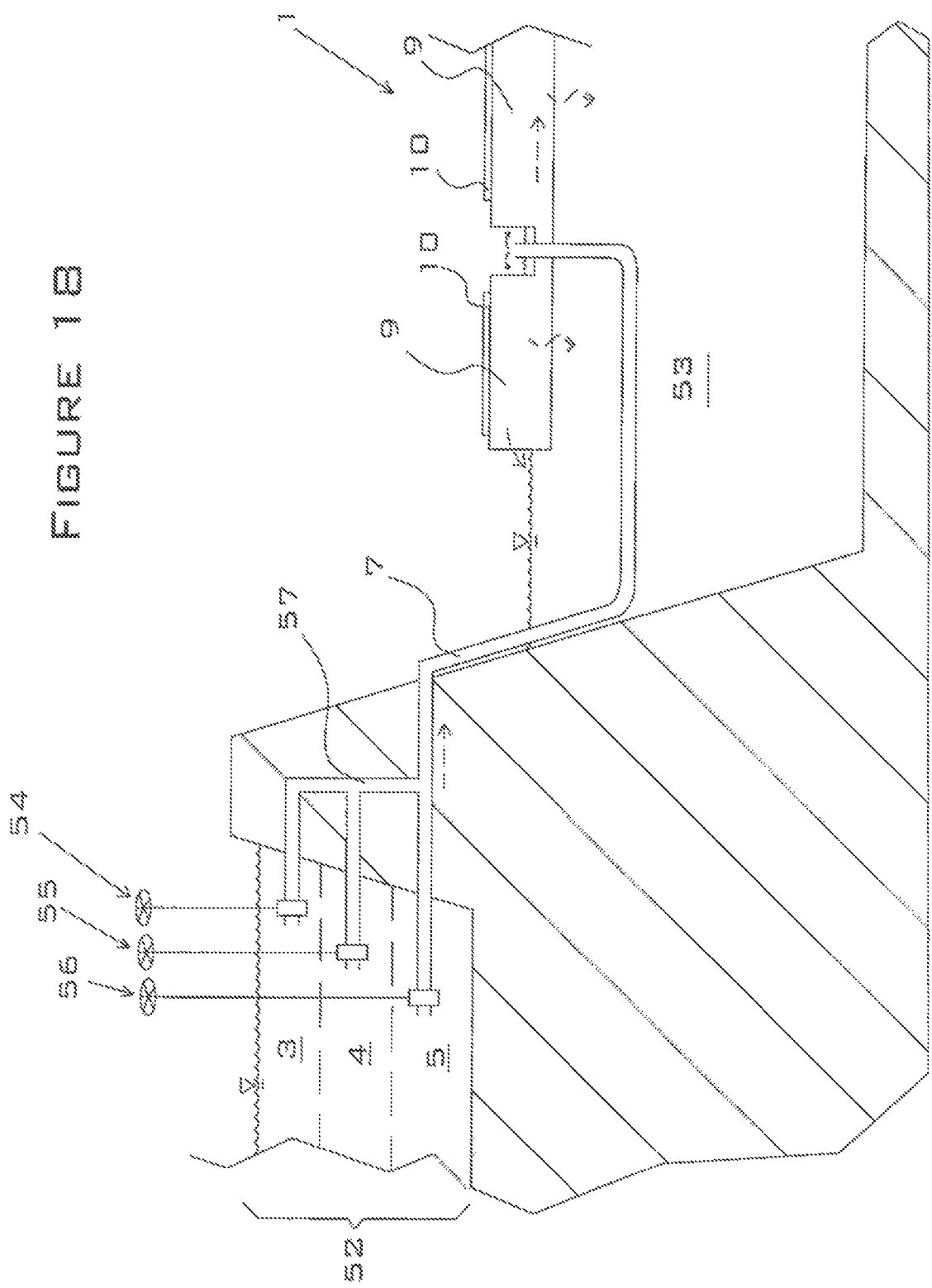
FIG. 18 is a schematic partial side view of an alternative embodiment of the present invention that utilizes gravity flow rather than a pump to circulate treatment water through the system.

FIG. 18 is a schematic partial side view of a gravity-powered floating streambed. In this figure, an upper stratified water body 52 is comprised of a surface layer 3, an intermediate layer 4, and a deep layer 5. The FTS 1 is deployed in the lower water body 53. The system comprises a surface-layer inlet control valve 54, an intermediate-layer inlet control valve 55, and a deep-zone inlet control valve 56. When one or more of the control valves 54, 55, 56 is/are opened, untreated water from the upper stratified water body 52 flows by gravity force through the open valve(s) 54, 55, 56 and then sequentially through the manifold 57, the inlet hose or pipe 7, and the treatment channels 9. After treatment by the FTS 1, the water is discharged into the lower water body 53.

By opening only one of the inlet control valves 54, 55, 56, the operator can select untreated water from the surface layer 3, the intermediate layer 4, or the deep layer 5, depending on specific site conditions. By adjusting the degree of opening of the inlet valves, the operator can control the flow rate of treatment water through the treatment channels 9. For example, contaminated anaerobic water from the deep layer 5 may require more treatment time than contaminated aerobic water from the shallow layer 2; therefore, the water flow rate into the FTS 1 from the deep layer 5 may need to be relatively lower than the water flow rate from the shallow layer 2 in order to achieve adequate biological treatment within the treatment channels 9. For this embodiment, the inlet pipe or hose 7 preferably is manufactured so as to have longitudinal flexibility combined with circumferential stiffness, which allows it to bend without collapsing. One suitable type of hose material for this embodiment is polyvinyl chloride (PVC) blower/vacuum hose that is reinforced with a molded-in spiral steel wire.

The present invention provides a blend of fish and other aquatic organism habitat that enhances the movement of nutrients into and through an aquatic food chain. For instance, scuds (*Gammarus* sp) can occur on the edge habitat associated with anoxic or anaerobic water, and the present invention maximizes such edge habitat. Adjustable flow rate through stream channels also provides for variable flowing water habitat, which in turn allows for conditions appropriate to specific minnow species, many of which consume periphyton, and accordingly facilitates the movement of nutrients into and through an aquatic food chain. Similarly, adjustable water flow, dissolved oxygen levels and water temperature can be manipulated to provide habitat optimization means for both fresh and salt water mussels, as well as oysters.

Shallow-water flow zones can provide additional optimized feeding habitat for shorebird species that prefer to feed on living scuds and insects in shallow water. As explained above, these shallow water zones can be provided by installing side exit channels within the treatment channels, and the flow rate and resulting water depth within the side exit channels may optionally be periodically varied in order to attract certain species of shorebirds.

Cycling intake water from various strata provides similar food opportunities for fish. For example, while suspended nutrient solids may be concentrated in a deep water strata, snails and zooplankton may be present in another, which in turn allows for management of food relative to a wide variety of animal species. The present invention provides a comprehensive ability to duplicate a range of aquatic and riparian edge and floodplain habitat. Each of these different habitat settings provides another food chain opportunity.

Since the parent application was filed, additional research and development has been conducted by the inventors related to a novel airlift pump device to be used in combination with the FTS. This new pump device serves as the circulation pump (previously described), and in addition, can serve as propulsion device to move an FTS within a water body. Accordingly, the invention described below is an FTS comprising a high-efficiency, flat plate airlift pump, in which the pump may be used for aeration, circulation, and de-icing of a lake, as well as propulsion of the FTS.

There are a number of FTS-compatible aerators and water circulators that are the subject of issued patents or pending applications, but none of these inventions includes the novel features of the airlift pump of the present invention, most notably: (1) an outlet section that provides a linear (as opposed to radial) flow path of discharged water and that comprises a deflector plate that is readily adjustable to reverse the direction of discharged water and/or adjust the outlet head and velocity of the discharged water; (2) a vertical column of rising water infused with air bubbles that is not constrained by sidewalls; and (3) an optional gimbaled mount to provide for rotational steerage of FTS structures.

U.S. Pat. No. 3,320,928 (Smith, 1967) discloses a pond aerator that comprises an air diffuser and a gas-recycling trap. The diffuser is not attached to the floating portion of the invention, and the invention does not incorporate any component for directing water flow away from the structure.

U.S. Pat. No. 5,595,691 (Hsu, 1997) discloses an air supply apparatus for pond fisheries that comprises a diffuser unit mounted on the bottom of the structure and adjustable flat plates (symmetrical battle boards). The purpose of the baffle boards is to retard the upward movement of air bubbles through the water column, thereby allowing increased time for a greater percentage of bubble gasses to dissolve into the water column. Although the baffle boards are adjustable for angle, they are not designed to provide for water circulation.

U.S. Pat. No. 5,755,976 (Kortmann, 1988) discloses a pond aeration device that uptakes water, brings it to surface, and then returns it to below surface for discharge, while exposing the water column to aeration bubbles. This invention discharges water in a radial pattern below surface.

U.S. Pat. No. 6,676,837 (Keeton, 2004) discloses a solar-electric aeration system that comprises a bubble diffuser located on the pond bottom, similar to the Smith invention above. The Keeton invention does not comprise a component for deflecting or steering the water column; therefore, the water flow is discharged in a radial pattern at the water surface.

U.S. Pat. No. 7,267,328 (Witheridge, 2007) discloses a pond aeration system that comprises an air diffuser mounted to the bottom of a riser pipe and a non-adjustable conical deflector unit that provides for radial water flow outward from the outlet of the device.

U.S. Pat. No. 7,874,548 B1 (McGuffin, 2011) discloses an aerator/directional water circulator that comprises air diffusers mounted on the bottom of a vertical riser and a curved deflector section at the top of the unit that produces horizontal water flow at the outlet of the device. The deflector section of this invention is not adjustable for angle (for varying the discharge head and velocity), nor can it be adjusted to reverse the flow direction of discharged water.

U.S. Pat. No. 8,016,273 (Dartez, 2011) discloses a pond aerator that comprises one or more diffusers and a deflector plate mounted within a rectangular housing. The deflector plate may be either flat or curved, but there is no provision for adjusting or reversing the angle of the plate.

U.S. Pat. No. 6,220,822 (Khudenko, 2001) discloses an airlift pump comprising an air injector that produces a stream of bubbles in a vertical riser pipe, which discharges water through a discharge port. This invention comprises an internal baffle in the form of a flat plate for the purpose of causing internal circulation of water within the device, thereby increasing the flow rate of the discharge water. The internal baffle plate is not adjustable, nor does it control the flow direction of the discharge water.

U.S. Pat. No. 7,520,493 B1 (Haldane, 2009) discloses a floating diffused-air aeration device. This invention comprises multiple diffusers attached to the bottom of a structure, an enclosed chamber for the vertical column of rising water with bubbles, and four non-adjustable baffles that direct the discharge water in four separate streams outward from the top of the structure at ninety (90)-degree angles to each other. Optionally, the four baffles may be replaced with a single cone-shaped deflector that directs the discharge water radially away from the structure.

U.S. Pat. No. 7,581,716 B2 (Tsai, 2009) discloses a floating aeration device comprising multiple discharge pipes that each create thrust when discharging. A controller is used to manipulate which of the multiple discharge pipes is/are turned on at a given time, thereby providing directionally-controllable thrust to the floating structure. This invention does not utilize compressed-air diffusers to provide the discharge water, nor are the outlet components of the device rotatable or reversible.

The present invention is an FTS comprising an optional airlift pump designed for use in lakes, ponds, wastewater lagoons, rivers, and marine settings. The airlift pump has several novel features. One key feature of the airlift pump is a rotatably adjustable deflector plate. This deflector plate may be rotatably adjusted along a horizontal axis to provide a combination of water velocity and vertical lift that provides maximum flow rate of the water flow through any particular treatment channel, regardless of the width, length and depth of the treatment channel. The deflector plate may also be rotatably adjusted to reverse the direction of outlet water flow so that water is ejected away from the FTS, thereby providing propulsion to move the FTS through the water body.

Another key feature of the airlift pump is an open frame design. By eliminating the vertical riser pipes or containment walls of the prior art, sidewall friction of the rising air/water column is eliminated, thereby resulting in a higher water flow rate for the same expenditure of energy than with other airlift pump designs. The combination of a rotatably adjustable deflector plate and an open support frame results in a novel airlift pump that produces a directionally reversible, adjustable-lift water flow that is highly energy efficient—a combination of benefits not found in the prior art pumps that are compatible with floating treatment streambeds.

Tests conducted by Floating Island International, Inc. ("FII") of Shepherd, Mont., indicated that a small FTS equipped with a small airlift pump powered by a ⅙ horsepower commercial blower produced a water flow rate of 581 gallons per minute, while a flow rate of 323 gallons per minute was produced using the same blower unit and a prior-art diffuser with a vertical riser pipe. Another set of tests conducted by FII with a larger FTS indicated that 5,800 gallons per minute of water flow were produced from a larger airlift pump powered by a two-horsepower blower in a four-foot wide channel.

Airlift pumps are devices that use compressed air bubbles to cause water to rise in a water body, thereby producing a flow of water while simultaneously aerating the flowing water. As used herein, the term "aeration" means to expose water to bubbles of compressed air, thereby increasing the concentration of dissolved gasses within the water. Dissolved gasses include those gasses that are naturally present in atmospheric air, such as oxygen and carbon dioxide.

One purpose of aeration is to make the water more livable to aquatic animals such as fish that require dissolved oxygen and aquatic plants that require dissolved carbon dioxide and oxygen. One purpose of causing water to move is to provide circulation in a lake or similar water body, wherein deep-zone waters are brought to the surface, and surface waters are transported to deeper zones. (As used herein, the term "lake" means any water body, including, but not limited to, ponds, lakes, sewage lagoons and marine waters.) This type of circulation can be beneficial for several purposes, including destratification of lakes that contain shallow, warm zones, trapped above deep, oxygen-depleted zones. Destratification can significantly increase the volume of lake water that is livable by fish and other aquatic animals, thereby increasing the recreational and economic value of the water body.

Airlift pumps of various configurations have been used for a number of years to provide aeration and circulation in lakes and ponds because they tend to be more energy-efficient than other pump/aeration systems. All of the airlift pumps that are currently available, however, contain certain inherent inefficiencies that are eliminated by the airlift pump of the present invention.

The present invention encompasses two embodiments of the airlift pump, in which the pump may be attached to or located within a treatment channel. The first embodiment comprises a deflector plate that is adjustable for angle, and the second embodiment comprises a deflector plate that is adjustable for height as well as angle. Both embodiments of the airlift pump comprise a source of compressed air connected to an air hose with a submersed outlet end, with a stream of air bubbles being released into the water body at a depth of about one to six feet below normal water surface from a diffuser at the outlet end of the air hose. In both embodiments, the stream of air bubbles rises vertically through the water body, thereby producing a vertical movement of water that rises along with the air bubbles. The stream of air bubbles and moving water is not constrained by sidewalls or pipe but is allowed to rise in an unconstrained column until it strikes a rigid plate (the "deflector plate"), which is set at angle that is tilted from the horizontal plane. The stream of air bubbles and water is deflected by the deflector plate, thereby causing the direction of flow to change from vertical to substantially horizontal.

Figure 19:
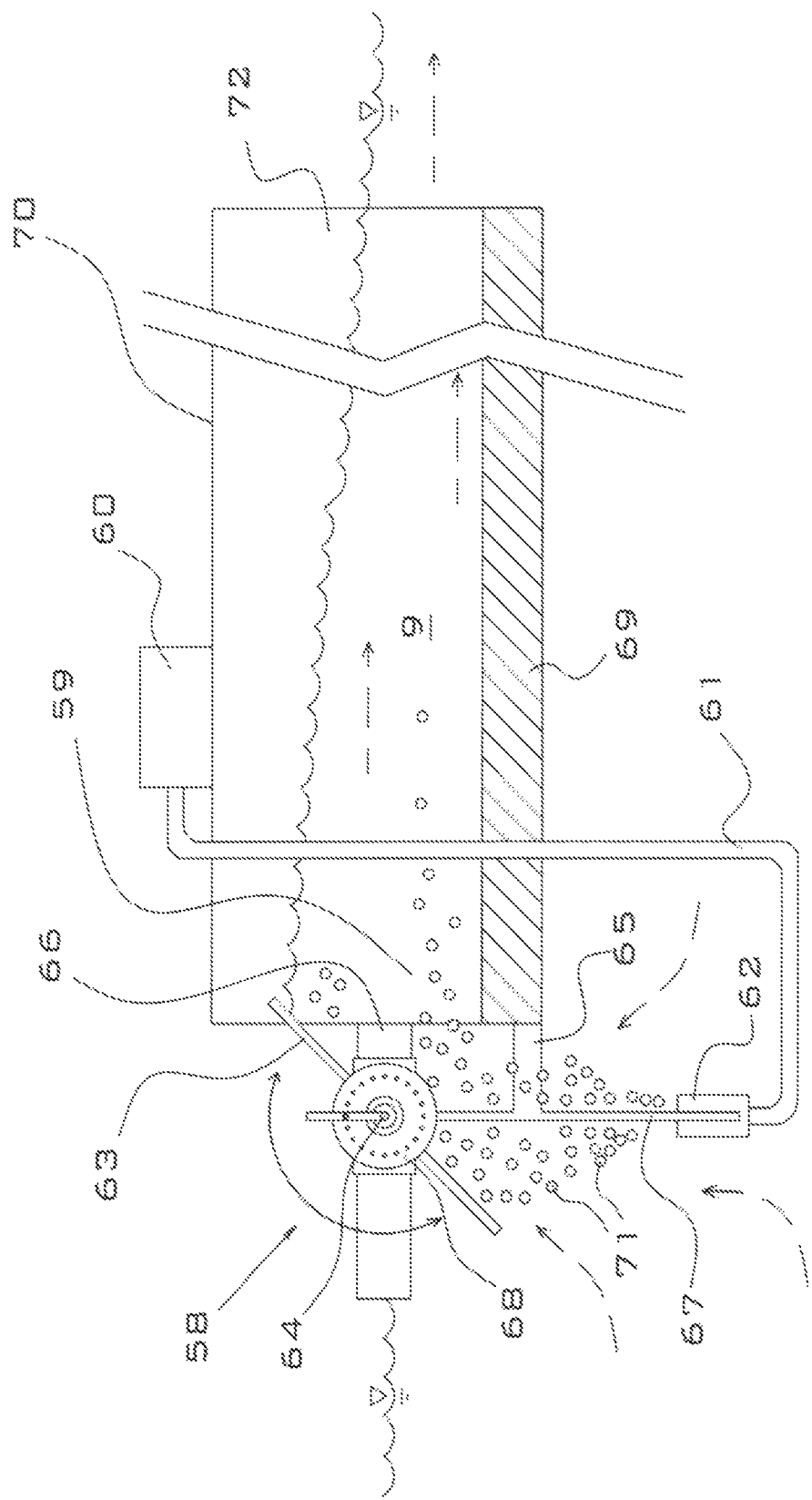
FIG. 19 is a simplified cross-section schematic side view of a first embodiment of the airlift pump of the present invention shown in relation to a single treatment channel, in which the pump is affixed to the treatment channel by a rigid connection, and adjusted to cause water to flow down the length of the treatment channel.
Figure 23:
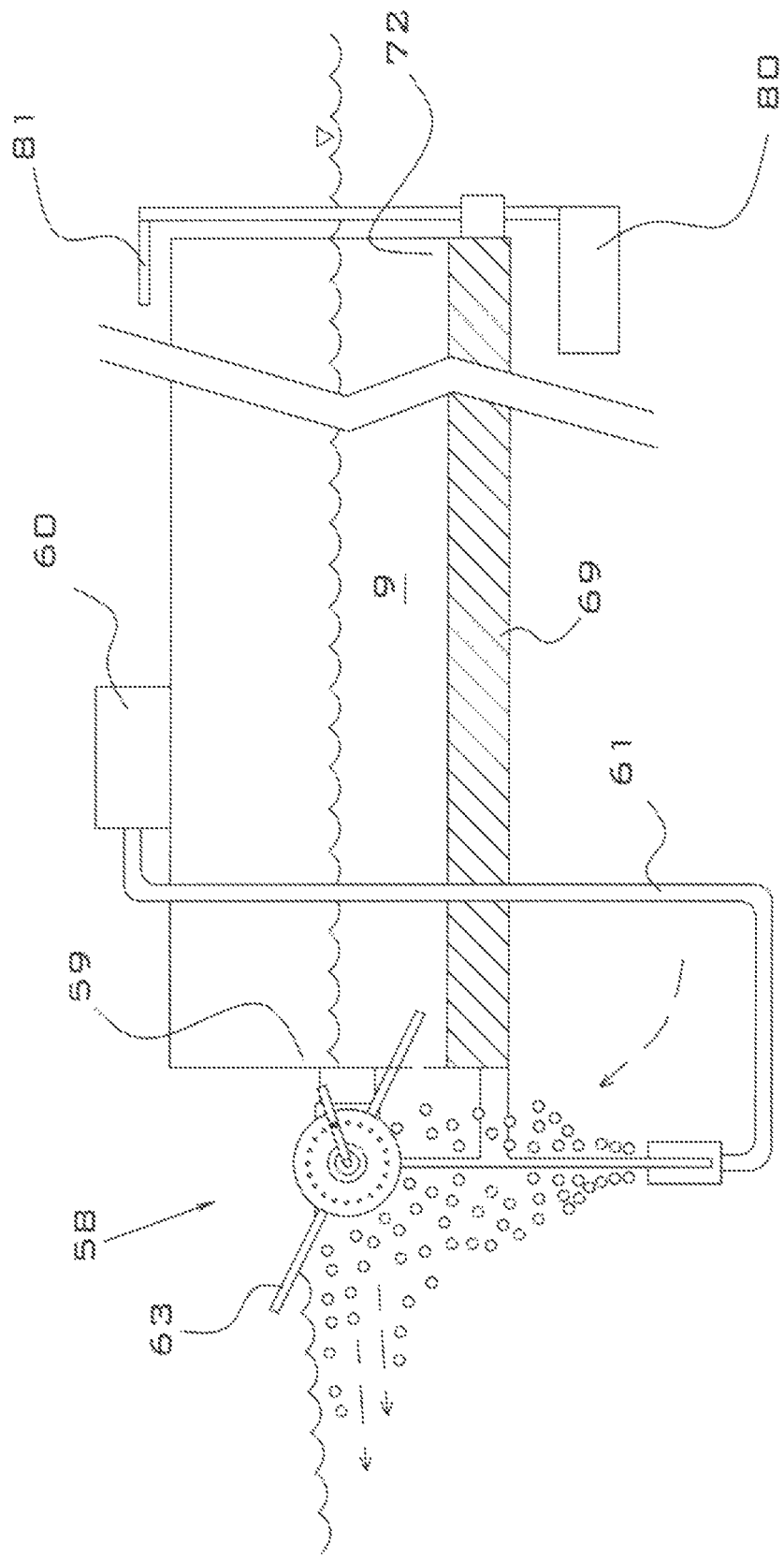
FIG. 23 is a simplified cross-section schematic side view of the first embodiment of the airlift pump of the present invention shown in relation to a single treatment channel, in which the pump is affixed to the treatment channel by a rigid connection, and adjusted to cause water to flow away from the treatment channel.

By adjusting the tilt direction of the deflector plate, the flow of air-bubble infused water out of the airlift pump may be directed in either a forward direction (i.e., toward a treatment channel) or a reverse direction (i.e., away from a treatment channel). When the angle of the deflector plate is set so that the front of the deflector plate is higher than the rear of the deflector plate, water flows in the forward direction, through the treatment channel. When the angle of the deflector plate is set so that the rear of the deflector plate is higher than the front of the deflector plate, water flows in the reverse direction, away from the treatment channel. Reverse flow direction produces a jet of water away from the FTS that results in forward thrust to the FTS. Illustrations of forward and reverse flow are shown in FIGS. 19 and 23.

In the first embodiment of the airlift pump, the deflector plate 63 is rigidly attached to a single pivot rod 64 that is connected across the top surface of the deflector plate 63. The pivot rod 64 extends past the left and right edges of the deflector plate 63 and is attached to left and right upper attachment arms 66 via holes that extend through each attachment arm 66. The diameters of the holes and the pivot rod 64 are selected so as to allow the pivot rod 64 to rotate freely within the holes. Because the deflector plate 63 is rigidly attached to the pivot rod 64, when the pivot rod 64 is rotated, the deflector plate 63 also rotates.

After the deflector plate 63 is set to a desired angular position by rotating the pivot rod 64, it is restrained from further movement by a locking mechanism. This locking mechanism (hereinafter referred to as the "plate lock 68") is comprised of an adjusting handle 76 that is rigidly connected to one end of the pivot arm 64, with the long axis of the adjusting handle 76 perpendicular to the long axis of the pivot rod 64, and a circular locking plate 75 that is rigidly attached to the outside edge of an attachment collar 74 that is adjacent to the adjusting handle 76. The arrangement of the adjusting handle 76 and the circular plate 75 are similar to that of a hand of a clock and the clock face; i.e., when the pivot rod 64 is rotated, the adjusting handle 76 rotates around the face of the circular plate 75 like the hour hand around a clock face. The circular plate 75 comprises a series of threaded holes 78, and the adjusting handle 76 comprises a corresponding bolt 79, so that when the bolt 89 of the adjusting handle 76 is threaded into one of the holes of the circular plate 75, the adjusting handle 76 is prevented from rotation, thereby also preventing the pivot rod 64 and deflector plate 63 from rotation.

In a first preferred method of attachment, the first embodiment 58 of the airlift pump is rigidly attached to the FTS by a pair of upper attachment arms 66 and a pair of lower attachment arms 65. A U-shaped hanger 67 is used to attach the diffuser 62 and the lower attachment arms 65 to the upper attachment arms 66. The U-shaped hanger 67 is attached perpendicularly to the underside of the upper attachment arms 66 via collars 74 that encircle the central portion of each upper attachment arm 66. The diffuser 62 is attached to the center of the horizontal member of the U-shaped hanger 67. The two lower attachment arms 65 are attached perpendicularly to the two vertical members of the U-shaped hanger 67. The upper attachment arms 66 are attached to the sidewalls 70 of the FTS treatment channel 9, and the lower attachment arms 65 are attached to the bottom 69 of the treatment channel 9. With this first preferred method of attachment of the airlift pump 58, the FTS may be steered by a bow-mounted rudder 80 and bow-mounted tiller 81 when the airlift pump 58 is adjusted to produce reverse flow.

In a second preferred method of attachment of the first embodiment 58 of the airlift pump to the treatment channel 9, a gimbaled mount 82 that is capable of rotation around a vertical axis is installed between the treatment channel 9 and the attachment arms 65, 66 of the airlift pump, so that the airlift pump 58 may be manually rotated from side to side in relation to the treatment channel 9, via a stern-mounted tiller 87 that is a component of the gimbaled mount 82. In this manner, when the deflector plate 63 is adjusted so as to provide reverse flow of water from the airlift pump 58, the airlift pump 58 may serve as a directional source of propulsion (similar to an outboard motor on a conventional boat).

In a second embodiment 88 of the airlift pump, the deflector plate 63 is supported by two pivot rods 90, 91, in contrast to the first embodiment, which comprises a single pivot rod 64. By incorporating two pivot rods 90, 91, the deflector plate 63 of the second embodiment 88 of the airlift pump may be adjusted vertically as well as rotationally. In the second embodiment 88, the airlift pump is installed near the inlet end 59 of, but within, the treatment channel 9, in contrast to the first embodiment 58, which is mounted at the inlet end 59 of the treatment channel. In the second embodiment 88, the airlift pump is supported by the sidewalls 70 of the treatment channel 9, and inlet water to the airlift pump 88 is provided via a cutout hole 89 in the bottom 69 of the treatment channel 9. The deflector plate 63 is supported by two pivot rods 90, 91 attached to the top of the deflector plate 63 that extend beyond the sides of the deflector plate 63. The ends of the front pivot rod 90 fit into holes that are incorporated into a pair of front support boards 93 mounted on each sidewall 70 of the treatment channel 9, and the ends of the rear pivot rod 91 fit into holes that are incorporated into a pair of rear support boards 94 that are also mounted on each sidewall 70 of the treatment channel 9. Each support board 93, 94 contains multiple holes that are installed in a vertical line along the length of the support boards 93, 94.

The tilt angle and direction of the deflector plate 63 is set by selecting a particular pair of matching holes for the front pivot rod 90 and another pair of matching holes for the rear pivot rod 91. When the front of the deflector plate 63 is set higher than the rear of the deflector plate 63, water is discharged down the length of the treatment channel 9 toward the outlet end 72 (forward flow), and when the rear of the deflector plate 63 is set higher than the front of the deflector plate 63, water is discharged away from the outlet end 72 of the treatment channel 9 (producing reverse flow). In the second embodiment 88, the height of the deflector plate 63 may be adjusted independently of the deflection angle of the deflector plate 63, whereas in the first embodiment 58, only the deflection angle is adjustable.

This feature (that is, adjustment of the height of the deflector plate independently of the deflection angle of the deflector plate) may be advantageous for maximizing the water flows for a particular channel configuration. For example, when a channel 9 is modified by placing blocks of filter media within an existing channel, the flow may be restricted, causing an increase in water depth upstream of the blocks. Under this condition, raising the height of the deflector plate 63 relative to the stream channel bottom 69, without changing the tilt angle of the deflector plate 63, may increase the flow rate of water through the modified channel 9. To alter the height of the deflector plate 63 without changing the tilt angle, the front pivot rod 90 and the rear pivot rod 91 are moved up or down by the same number of holes in the support boards 93, 94. The concepts of varying the height and tilt angle of the deflector plate 63 are explained in detail in reference to FIGS. 27 and 29.

Either of the airlift pump embodiments 58, 88 may be fitted with an optional extension pipe 99 that allows the airlift pumps 58, 88 to draw in water directly from deep zones within the water body. The extension pipe 99 is oriented vertically and is connected to the airlift pump 58 or 88 and treatment channel 9 by pipe supports 100. The top of the extension pipe 99 is positioned over the diffuser 62, with the diffuser 62 centered radially within the extension pipe 99 near the top end of the extension pipe 99, and the bottom of the extension pipe 99 is set at the desired inlet water depth.

FIG. 19 is a simplified cross-section schematic side view of the first embodiment 58 of the airlift pump of the present invention shown in relation to a single treatment channel 9. In the configuration shown in FIG. 19, which is the first preferred method of attachment, the airlift pump 58 is rigidly affixed to the treatment channel 9, and the deflector plate 63 of the airlift pump 58 is adjusted so as to cause water to flow down the length of the channel 9. Referring to FIG. 19, the airlift pump 58 is installed at the inlet 59 of a treatment channel 9. In this embodiment, the airlift pump 58 comprises an air compressor 60, an air supply hose 61, a diffuser 62, a deflector plate 63, a pivot rod 64, lower attachment arms 65, upper attachment arms 66, a U-shaped hanger 67 and a plate lock 68. The treatment channel 9 comprises a bottom 69 and sidewalls 70. The treatment channel 9 is shown shortened for clarity in FIG. 19 but may be any length.

Air bubbles 71 for the airlift pump 58 are supplied by an air compressor 60 that is attached to one sidewall 70 of the stream channel 9. The air compressor 60 draws in atmospheric air, compresses it, and discharges the compressed air into an air supply hose 61 that is connected between the outlet of the air compressor 60 and the diffuser 62 with threaded or glued hose connectors (not shown). The compressed air travels through the air supply hose 61 and exits in the form of bubbles 71 through the diffuser 62. The diffuser 62 is preferably an open-ended pipe that produces large bubbles and does not restrict air flow. Alternately, the diffuser may comprise an internal screen to break the air stream into small bubbles. The released air rises through the water column, and the rising air bubble stream produces a rising water flow within the column of air bubbles. The mixture of air and water rises until it contacts the deflector plate 63, which changes the direction of flow from vertical to approximately horizontal. The angle of the deflector plate 63 relative to the horizontal plane is set by the plate lock 68, which is shown in detail in FIG. 21. (Note that the second embodiment does not require a plate lock because the deflector plate is fixed by the two pivot rods.) The solid arrow in FIG. 19 illustrates the direction of angular rotation of the deflector plate 63, and the dashed arrows indicate the direction of water flow induced by the pump. The mixture of air and water is directed into the inlet 59 of the treatment channel 9, and it flows down the treatment channel 9 from the inlet 59 to the outlet 72. A portion of the air/water mixture percolates through the permeable bottom 69 and sidewalls 70 of the treatment channel 9, and the remaining portion exits the treatment channel 9 at the outlet 72 and returns to the water body as a surface stream.

The air compressor 60 is preferably a commercial low-pressure, high-flow rate blower unit that is mounted in a weatherproof housing and attached to one sidewall 70 of the treatment channel 9 by removable clamps (not shown). The air compressor 60 may be powered by electricity, gasoline, or diesel fuel.

The air hose 61 is preferably comprised of flexible polymer hose. The diffuser 62 is preferably comprised of rigid polymer or aluminum piping. The deflector plate 63 is preferably comprised of aluminum or fiber-reinforced polymer. The pivot rod 64 is preferably comprised of aluminum hollow rod or solid pipe. The lower attachment arms 65 are preferably comprised of polymer boards or aluminum channel. The upper attachment arms 66 are preferably comprised of polymer pipe that is filled with air or polymer foam and sealed to provide buoyancy. The U-shaped hanger 67 is preferably comprised of aluminum channel, hollow pipe, or solid rod. The collars 74 are preferably comprised of aluminum tubing.

Figure 21:
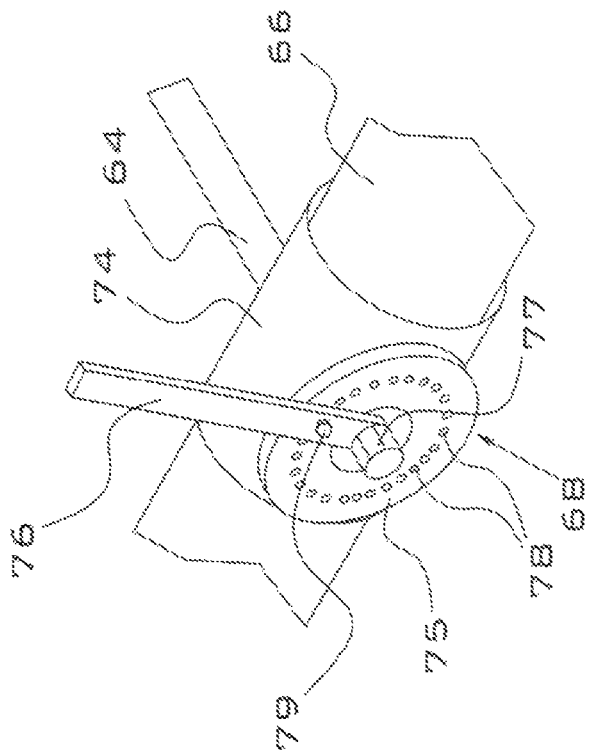
FIG. 21 is a detail view of the plate lock of the airlift pump shown in FIG. 20.
Figure 20:
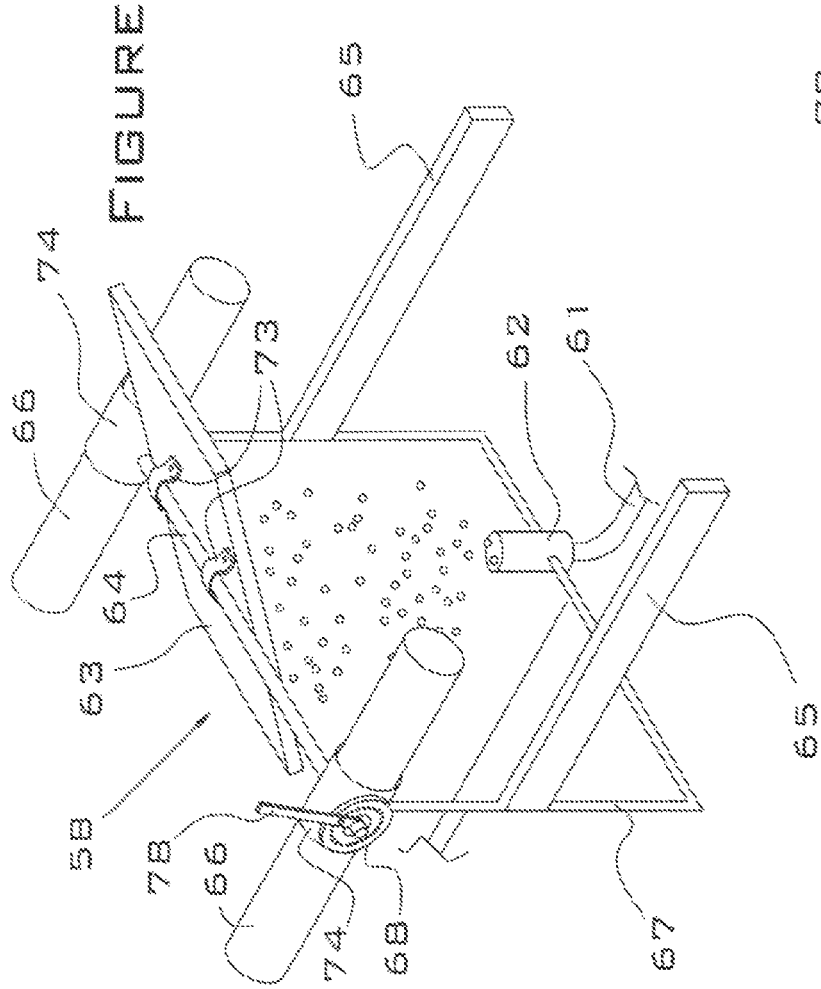
FIG. 20 is a perspective view of the first embodiment of the airlift pump shown in FIG. 20 with the treatment channel omitted for clarity.

FIG. 20 is a perspective view of the first embodiment 58 of the airlift pump shown in FIG. 19, with the treatment channel 9 omitted for clarity. FIG. 21 is a detail view of the components of the plate lock 68 shown in FIGS. 19 and 20. These drawings illustrate one means for setting the deflector plate 63 to a desired angle, although other means (for example, a pivot rod with lock nut) may be employed to set the deflector plate angle. As shown in FIG. 20, the deflector plate 63 is attached to the pivot rod 64 with two clamps 73. The U-shaped hanger 67 is connected to the two upper attachment arms 66 by two cylindrical collars 74, which encircle the upper attachment arms 66. The diffuser 62 and the lower attachment arms 65 are attached to the U-shaped hanger 67, preferably by welding or bolting.

As shown in FIG. 21, the plate lock 68 comprises a circular plate 75, an adjusting handle 76, and a retaining nut 77. The circular plate 75 comprises a series of threaded bolt holes 78 arranged in a circular pattern. The adjusting handle 76 is fixed to the pivot rod 64. The adjusting handle 76 comprises a removable bolt 79 that can be threaded into any one of the threaded bolt holes 78 in the circular plate 75. To set the deflector plate 63 (shown in FIGS. 19 and 20) to a desired angle, the bolt 79 is removed from the adjusting handle 76, and the adjusting handle 76 is rotated, which causes the pivot rod 64 and the deflector plate 63 to rotate. When the desired angle of the deflector plate 63 is achieved, the bolt 79 is inserted into an appropriate hole 78 in the circular plate 75, thereby preventing further rotation of the deflector plate 63. The circular plate 75 and the adjusting handle 76 are preferably comprised of cast or machined aluminum.

Figure 22:
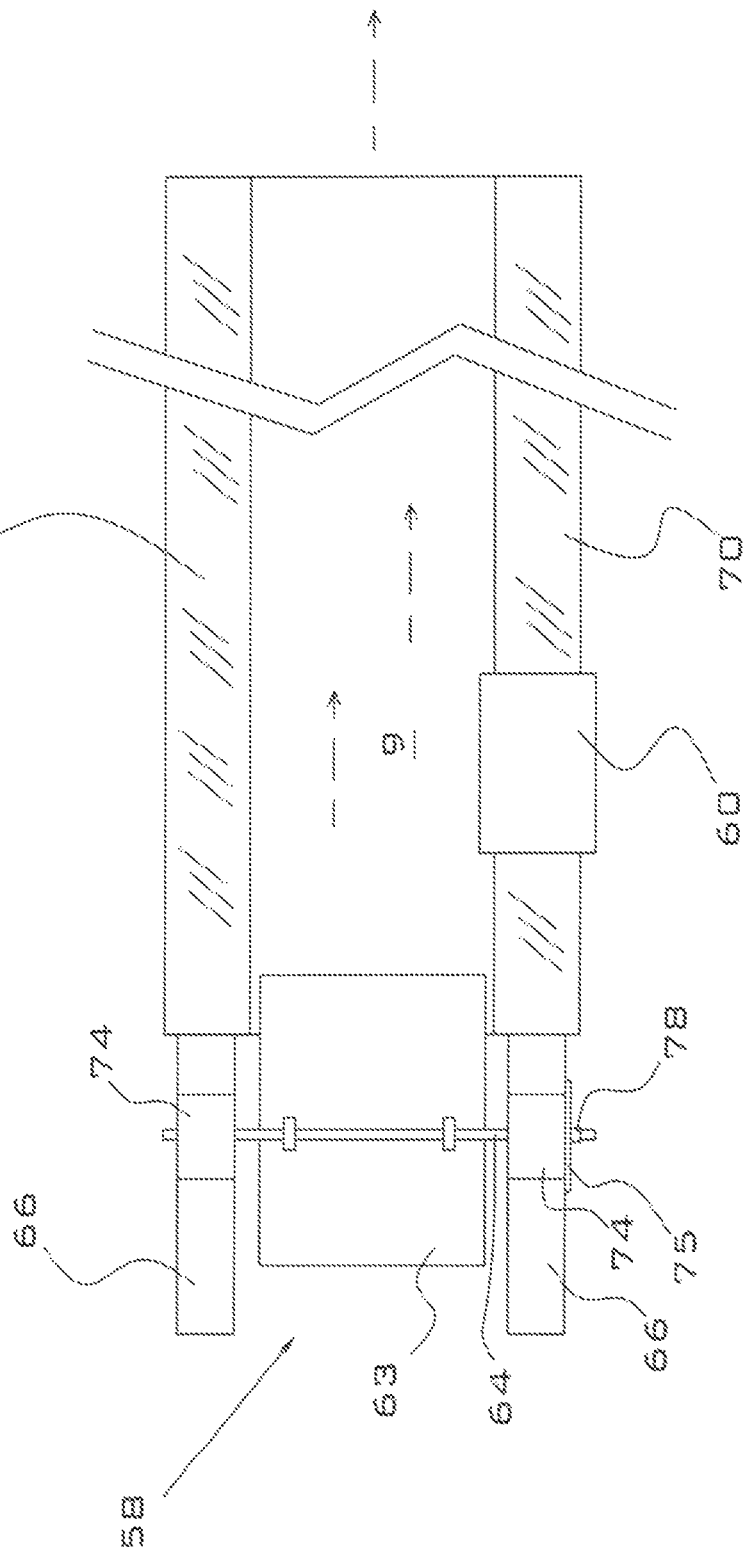
FIG. 22 is a top view of the present invention shown in FIG. 19.

FIG. 22 is a top view of the embodiment shown in FIG. 19. As shown, the width of the deflector plate 63 (measured perpendicular to the length of the treatment channel 9) is selected so as to slightly smaller than the width of the treatment channel 9 between the two sidewalls 70 of the treatment channel 9. With this width for the deflector plate 63, the deflector plate 63 is free to rotate without rubbing the sidewalls 70, while the water flow out of the airlift pump 58 flows across the entire width of the treatment channel 9.

FIG. 23 is a simplified cross-section schematic side view of the first embodiment 58 of the airlift pump of the present invention shown in relation to a single treatment channel. In the configuration shown in FIG. 23, the airlift pump 58 is rigidly affixed to the treatment channel 9, and the deflector plate 63 of the airlift pump 58 is adjusted so as to cause water to flow away from the channel 9 by setting the rear edge of the deflector plate 63 higher than the front edge. This setting position of the deflector plate 63 is selected when the airlift pump 58 is used for propulsion of an FTS. The discharged water acts at a jet, and the FTS moves in the opposite direction of the flow of discharged water. In this configuration, the FTS may be steered by a bow rudder 80 that is connected to a steering tiller 81, which is rotatably attached to the outlet end 72 of the treatment channel 9.

Figure 24:
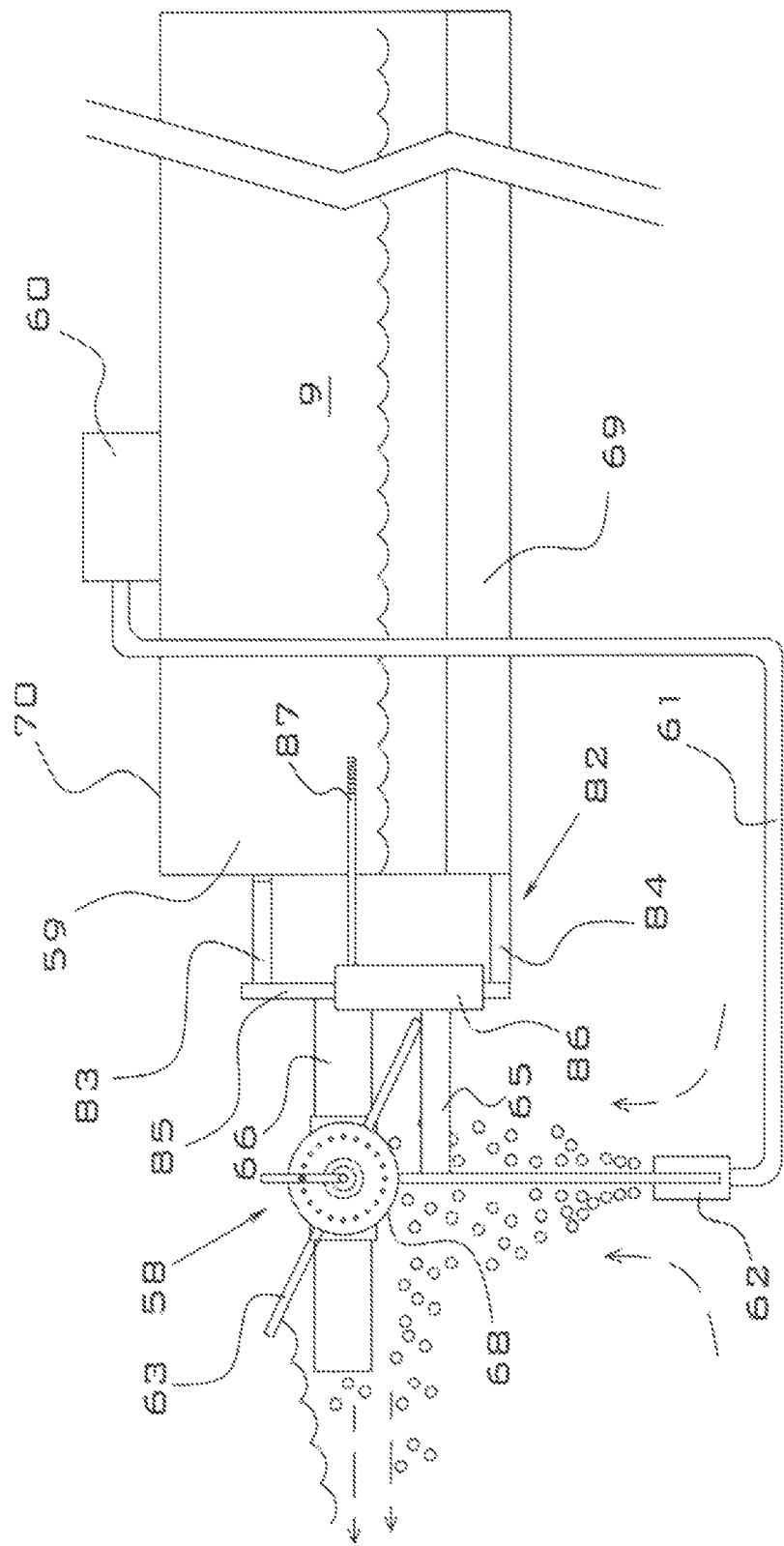
FIG. 24 is a simplified cross-section schematic side view of the first embodiment of the airlift pump of the present invention shown in relation to a single treatment channel, in which the pump is affixed to the treatment channel by a rotatably adjustable connection.

FIG. 24 is a simplified cross-section schematic side view of the first embodiment 58 of the airlift pump of the present invention shown in relation to a single treatment channel. In the configuration shown in FIG. 24, which is the second preferred method of attachment, the airlift pump 58 is affixed to the treatment channel 9 with a rotatable connection, and the deflector plate 63 of the airlift pump 58 is adjusted so as to cause water to flow away from the channel 9 by setting the rear edge of the deflector plate 63 higher than the front edge. This rotatable attachment comprises a gimbaled mount 82 that rotates around a vertical axis, which allows the pump 58 to rotate from side to side for steerage, similar to the manner in which a conventional outboard motor may be rotated to steer a conventional boat. The gimbaled mount 82 is shown in more detail in FIG. 25, which is a perspective drawing of the pump and gimbaled mount attachment shown with the FTS omitted for clarity.

Referring to FIGS. 24 and 25, the gimbaled mount 82 comprises some parts that are rigidly affixed to the inlet end 59 of the treatment channel 9. These rigidly-affixed parts include an upper support beam 83, a lower support beam 84, and a vertical shaft 85. The upper support beam 83 is rigidly connected to the sidewalls 70 of the treatment channel 9, and the lower support beam 84 is rigidly connected to the bottom 69 of the treatment channel 9. The gimbaled mount attachment 82 also comprises parts that are capable of swiveling about the axis of the vertical shaft 85. These components include a rotatable sleeve 86 and a stern tiller 87. The rotatable sleeve 86 is rigidly connected to two lower attachment arms 65.

By means of the gimbaled mount attachment 82, the direction of the water stream that is discharged from the airlift pump 58 relative to the treatment channel 9 can be adjusted by a user by rotating the stern tiller 87. When the discharged water stream is directly in line with the long axis of the treatment channel 9, the FTS will be propelled straight forward by the reactive force produced by the discharged water (i.e. jet action); however, when the water stream direction is set at an angle to the long axis of the treatment channel 9 (by rotating the stern tiller 87), the FTS will be propelled in a direction that causes it to veer either left or right, depending on the position of the stern tiller 87.

FIG. 26 is a top view of the embodiment shown in FIG. 24. This figure shows the position of the airlift pump 58 in relation to the treatment channel 9. As shown, the upper support beam 83 is a T-shaped part that attaches to the two sidewalls 70 of the treatment channel 9 at the inlet 59. The lower support beam 84 (shown in FIG. 25) is a straight beam that attaches to the bottom 69 of the treatment channel 9. The support beams 83, 84 are preferably comprised of aluminum channel or polymer boards. The support beams 83, 84 may be attached to the sidewalls 70 and bottom 69 (shown in FIG. 25) of the treatment channel 9 by adhesive foam or by bolts.

FIG. 27 is a cross-section side view of the second embodiment of the airlift pump 88 of the present invention, shown in relation to a single treatment channel 9. FIG. 28 is a cross-section front view of the embodiment shown in FIG. 27. FIG. 29 is a side view of the second embodiment of the airlift pump 88 with the treatment channel 9 omitted for clarity. As shown in FIGS. 27 and 28, the airlift pump 88 is located within the treatment channel 9, with inlet water for the airlift pump 88 supplied through a rectangular cutout 89 in the bottom 69 of the treatment channel 9. As shown in FIGS. 27 and 29, the airlift pump 88 is comprised of a deflector plate 63 that is supported by a front pivot rod 90 and a rear pivot rod 91. The deflector plate 63 is attached to the pivot rods 90, 91 by attachment clamps 73. Each end of each pivot rod 90, 91 fits into one of multiple holes 92 in the two front support boards 93 and the two rear support boards 94.

The angle and height of the plate 63 is set by selecting a particular set of holes 92 into which the two pivot rods 90, 91 are set. Referring to FIGS. 27 and 29, the front pivot rod 90 of the deflector plate 63 is shown set into the third holes 92 from the top in front support boards 93, while the rear pivot rod 91 is set into the sixth holes 92 from the top in rear support boards 94. To change the angle of the deflector plate, for example, the position of the front pivot rod 90 may be moved up to the second hole from the top in front support boards 93, while the rear pivot rod 91 is not moved. This change will result in an increase in the angle of the deflector plate 63 compared to the previous angular position, measured relative to the bottom 69 of the stream channel 9. To change the height of the deflector plate without varying the angle, for example, the front pivot rod 90 and the rear pivot rod 91 may each be moved up one set of holes 92 in the support boards 93, 94. This change will raise the entire deflector plate 63 relative to the elevation of the bottom 69 of the stream channel 9.

As with the previous embodiments, when the front 95 of the deflector plate 63 is set at a higher elevation than the rear 96 of the deflector plate 63 (as shown in FIGS. 27 and 29), water will be discharged into the treatment channel 9. Conversely, when the rear 96 of the deflector plate 63 set higher than the front 95 of the deflector plate (not shown), the discharged water will be directed away from the treatment channel 9, and the FTS will be propelled in a direction opposite from the direction of the flow of the discharged water.

As shown in FIG. 28, the second embodiment 88 of the pump is supported by the sidewalls 70 of the treatment channel 9 by angle support brackets 97 that rest on top of and are attached to the sidewalls 70 by foam adhesive or bolts. The front support boards 93 and rear support boards 94 (not shown) are attached to the angle support brackets 97 by bolts. Optional cutouts 98 may be installed into the sidewalls 70 of the treatment channel 9 adjacent to the angle support brackets 97 to provide space for a wider deflector plate 63 than would otherwise fit into width of the treatment channel 9.

Figure 30:
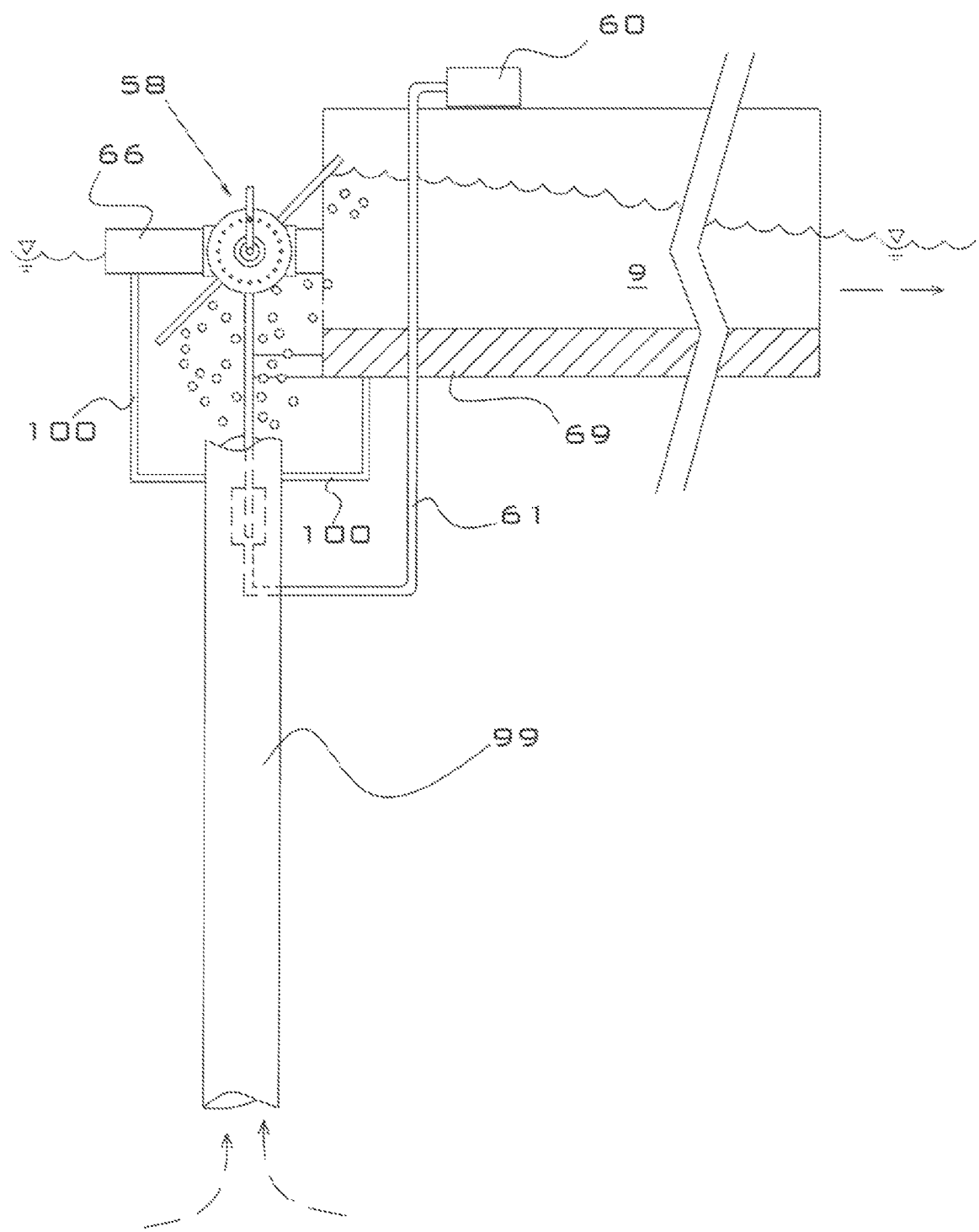
FIG. 30 is a simplified cross-section schematic side view of the first embodiment of the airlift pump of the present invention shown in relation to a single treatment channel, shown with an optional extension pipe.

FIG. 30 is a simplified cross-section schematic side view of the first embodiment of the airlift pump of the present invention shown in relation to a single treatment channel. This configuration is similar that shown in FIG. 19, except that the configuration of FIG. 30 comprises an optional extension pipe 99. The purpose of the extension pipe 99 is to allow the airlift pump 58 to draw in water from deep zones within the water body. The extension pipe 99 is preferably comprised of flexible or semi-rigid polymer pipe. Pipe supports 100 may be used to attach the extension pipe 99 to the upper attachment arms 66 and the treatment channel bottom 69, as shown. The pipe supports 100 are preferably comprised of polymer boards or aluminum channel.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:
1. A floating streambed comprising:
 (a) an airlift pump comprising a rotatably adjustable deflector plate, the deflector plate having an angle and a height, wherein both the angle and the height of the deflector plate are adjustable; and
 (b) one or more treatment channels comprised of permeable matrix;
 wherein the height of the deflector plate is adjustable without moving the one or more treatment channels and independently of the angle of the deflector plate;
 wherein the floating streambed floats on a water body;
 wherein water is pumped by the airlift pump into the treatment channels; and
 wherein water entering the treatment channels flows both along the treatment channels and through the permeable matrix of the treatment channels.

2. The floating streambed of claim 1, wherein each treatment channel comprises an inlet, and wherein the airlift pump is installed at the inlet of the treatment channel.

3. The floating streambed of claim 1, wherein the airlift pump is installed within the treatment channel.

4. The floating streambed of claim 1, wherein the airlift pump further comprises an air compressor, an air supply hose, a diffuser, a pivot rod, a pair of lower attachment arms, a pair of upper attachment arms, and a U-shaped hanger;
 wherein the U-shaped hanger attaches the diffuser and lower attachment arms to the upper attachment arms;
 wherein the U-shaped hanger is attached to the upper attachment arms via collars that encircle a central portion of each upper attachment arm;
 wherein the upper attachment arms are attached to sidewalls of the treatment channel; wherein lower attachment arms are attached to a bottom of the treatment channel; and
 wherein the pivot rod is fixedly attached to the deflector plate and pivotally attached to the upper attachment arms.

5. The floating streambed of claim 1 wherein the deflector plate is supported by a first pivot rod having a first end and a second end and a second pivot rod having a first end and a second end;
 wherein the treatment channel comprises two sidewalls;
 wherein the first and second ends of the first pivot rod fit into holes in a pair of front support boards mounted on the sidewalls of the treatment channel;

wherein the first and second ends of the second pivot rod fit into holes in a pair of rear support boards that are mounted on the sidewalls of the treatment channel;

wherein each of the front and rear support boards has a length; and wherein the holes in the front and rear support boards are arranged vertically along the length of the front and rear support boards.

6. The floating streambed of claim 1, further comprising a plate lock that is configured to prevent angular rotation of the deflector plate.

7. The floating streambed of claim 1, wherein the airlift pump is rotatably mounted to the treatment channel such that the airlift pump is capable of rotation about a vertical axis.

8. The floating streambed of claim 1, further comprising an extension pipe that is connected to the airlift pump and treatment channel by pipe supports.

9. The floating streambed of claim 1 wherein the deflector plate is supported by at least one pivot rod sized to fit into holes in one or more support boards mounted on the sidewalls of the treatment channel;

wherein the angle of the deflector plate is set by selecting particular holes and inserting the pivot rod into the selected holes.

10. The floating streambed of claim 9 wherein the at least one pivot rod comprises two pivot rods such that the deflector plate may be adjusted vertically and rotationally.

11. A floating streambed comprising:
(a) a circulation pump comprising a rotatably adjustable deflector plate, the deflector plate having an angle and a height, wherein both the angle and the height of the deflector plate are adjustable; and
(b) one or more treatment channels comprised of permeable matrix;

wherein the height of the deflector plate is adjustable without moving the one or more treatment channels and independently of the angle of the deflector plate;

wherein the floating streambed floats on a water body;

wherein water is pumped by the circulation pump into the treatment channels; and wherein the water entering the treatment channels flows both along the treatment channels and through the permeable matrix of the treatment channels.

12. A floating structure comprising:
(a) an airlift pump comprising a rotatably adjustable deflector plate, the deflector plate having an angle and a height, wherein both the angle and the height of the deflector plate are adjustable; and
(b) one or more treatment channels comprised of permeable matrix;

wherein the height of the deflector plate is adjustable without moving the one or more treatment channels and independently of the angle of the deflector plate;

wherein the floating structure floats on a water body;

wherein water is pumped by the airlift pump into the treatment channels; and wherein the water entering the treatment channels flows both along the treatment channel and through the permeable matrix of the treatment channels.

13. A floating streambed comprising at least one treatment channel and a steerable propulsion system, wherein the propulsion system comprises an airlift pump that is rotatably mounted to the inlet end of a treatment channel, the airlift pump comprising a rotatably adjustable deflector plate, the deflector plate having an angle and a height, wherein both the angle and the height of the deflector plate are adjustable;

wherein the height of the deflector plate is adjustable without moving the treatment channel and independently of the angle of the deflector plate.

14. A floating structure comprising at least one treatment channel and a steerable propulsion system, wherein the propulsion system comprises an airlift pump that is rotatably mounted to the inlet end of a treatment channel, the airlift pump comprising a rotatably adjustable deflector plate, the deflector plate having an angle and a height;

wherein the height of the deflector plate is adjustable without moving the treatment channel and independently of the angle of the deflector plate.

* * * * *